United States Patent
Konishi

(10) Patent No.: US 11,680,916 B2
(45) Date of Patent: Jun. 20, 2023

(54) MACHINE LEARNING DEVICE, CONTROL SYSTEM, AND MACHINE LEARNING METHOD

(71) Applicant: FANUC CORPORATION, Yamanashi (JP)

(72) Inventor: Kouki Konishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 311 days.

(21) Appl. No.: 16/939,430

(22) Filed: Jul. 27, 2020

(65) Prior Publication Data
US 2021/0055240 A1 Feb. 25, 2021

(30) Foreign Application Priority Data
Aug. 23, 2019 (JP) .............................. JP2019-152822

(51) Int. Cl.
*G06N 20/00* (2019.01)
*G01N 25/20* (2006.01)
(Continued)

(52) U.S. Cl.
CPC .......... *G01N 25/20* (2013.01); *G05B 13/0265* (2013.01); *G05B 19/404* (2013.01);
(Continued)

(58) Field of Classification Search
CPC .... G01N 25/16; G01N 25/20; G05B 13/0265; G05B 19/404; G05B 2219/33034;
(Continued)

(56) References Cited

U.S. PATENT DOCUMENTS

2002/0038189 A1* 3/2002 Mizuguchi ............. B23Q 15/18
702/94
2008/0215178 A1* 9/2008 Senda ................ B23Q 11/0007
700/175
(Continued)

FOREIGN PATENT DOCUMENTS

JP          11-114776       4/1999
JP          H11-338527 A   12/1999
(Continued)

OTHER PUBLICATIONS

Zhang, Machine Learning-Based Temperature Prediction for Runtime Thermal Management across System Components, Mar. 1, 2016, IEEE Transactions on Parallel and Distribute, vol. XX, No. Yy, pp. 1-15. (Year: 2016).*

*Primary Examiner* — Kidest Bahta
(74) *Attorney, Agent, or Firm* — Wenderoth, Lind & Ponack, L.L.P.

(57) ABSTRACT

A machine learning device includes a virtual temperature model calculating unit having an equation including a first coefficient for determining a heat generation amount and a second coefficient for determining a heat dissipation amount. The virtual temperature model calculating unit is configured to calculate virtual temperature data by estimating a temperature of a specific portion of a machine by the equation using heat generation factor data. A thermal displacement model calculating unit is configured to calculate, using the calculated virtual temperature data and actual temperature data acquired from at least one temperature sensor mounted to a portion other than the specific portion, an error between thermal displacement estimated by the equation and actually measured thermal displacement, in which the virtual temperature model calculating unit per-
(Continued)

forms machine learning to search for the first coefficient and the second efficient so that the error is minimized.

11 Claims, 14 Drawing Sheets

(51) Int. Cl.
  *G06N 5/04* (2023.01)
  *G05B 13/02* (2006.01)
  *H02P 29/60* (2016.01)
  *G05B 19/404* (2006.01)

(52) U.S. Cl.
  CPC .............. *G06N 5/04* (2013.01); *G06N 20/00* (2019.01); *H02P 29/60* (2016.02); *G05B 2219/33034* (2013.01); *G05B 2219/37429* (2013.01)

(58) Field of Classification Search
  CPC .......... G05B 2219/37429; G05B 2219/49206; G05B 2219/49209; G06N 20/00; G06N 3/006; G06N 5/04; H02P 29/60
  See application file for complete search history.

(56) References Cited

U.S. PATENT DOCUMENTS

| | | | |
|---|---|---|---|
| 2009/0055126 A1* | 2/2009 | Yanovich | G05B 19/41875 702/179 |
| 2013/0151191 A1* | 6/2013 | Ranieri | G01K 7/427 702/130 |
| 2013/0190921 A1* | 7/2013 | Maekawa | B23Q 11/0007 700/177 |
| 2018/0275629 A1* | 9/2018 | Watanabe | G01K 13/00 |

FOREIGN PATENT DOCUMENTS

| | | |
|---|---|---|
| JP | 2006-116663 A | 5/2006 |
| JP | 2015-199168 | 11/2015 |
| JP | 2018-153901 | 10/2018 |

\* cited by examiner

FIG. 5
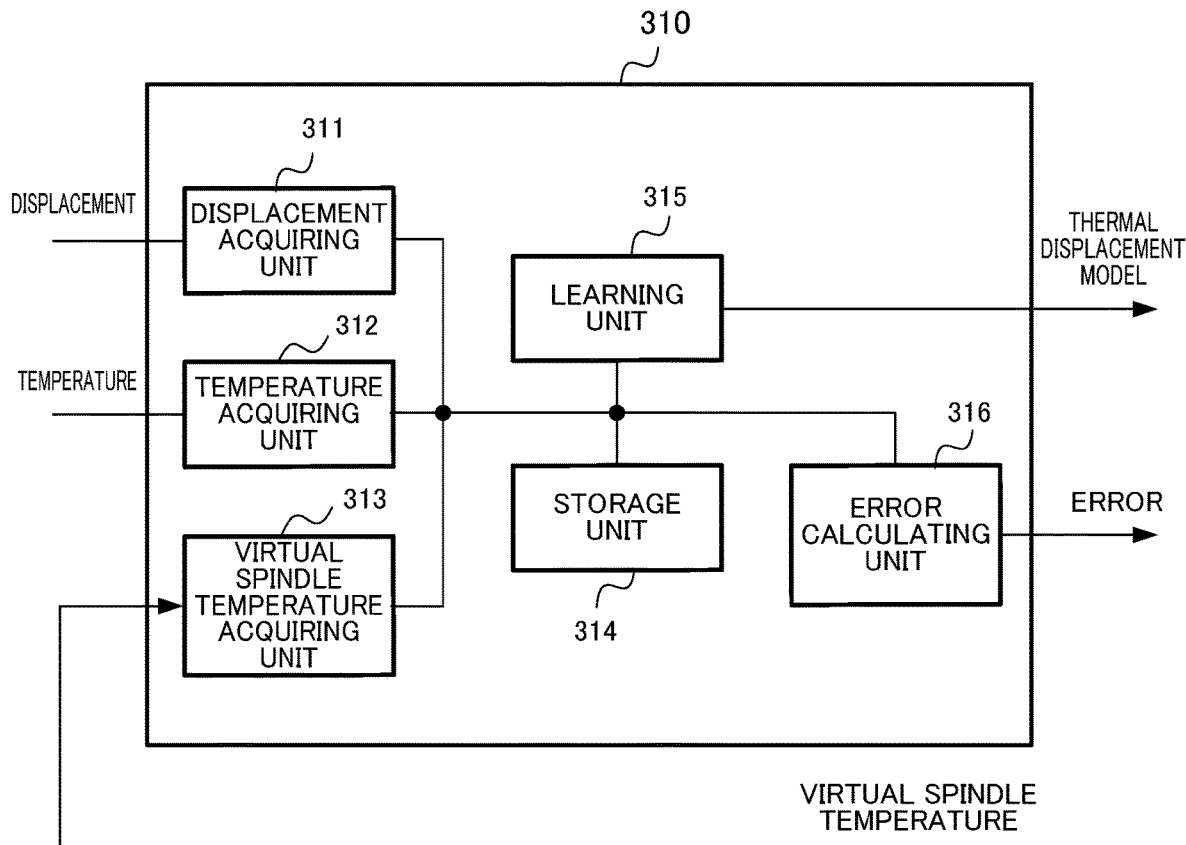
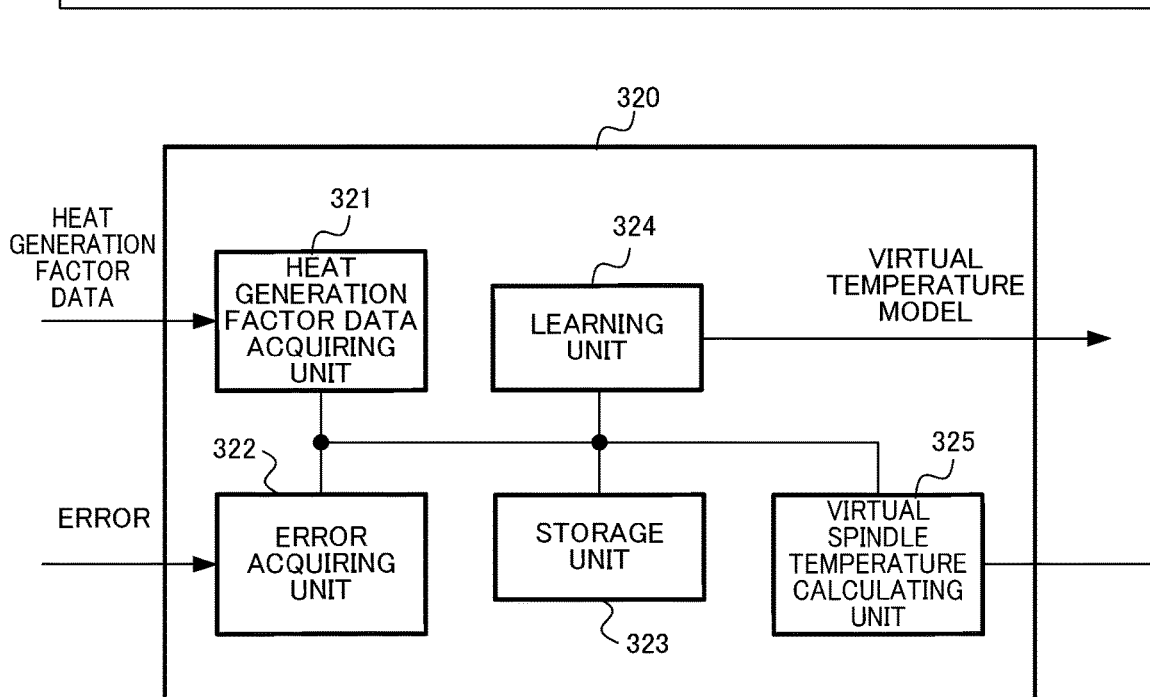

FIG. 11
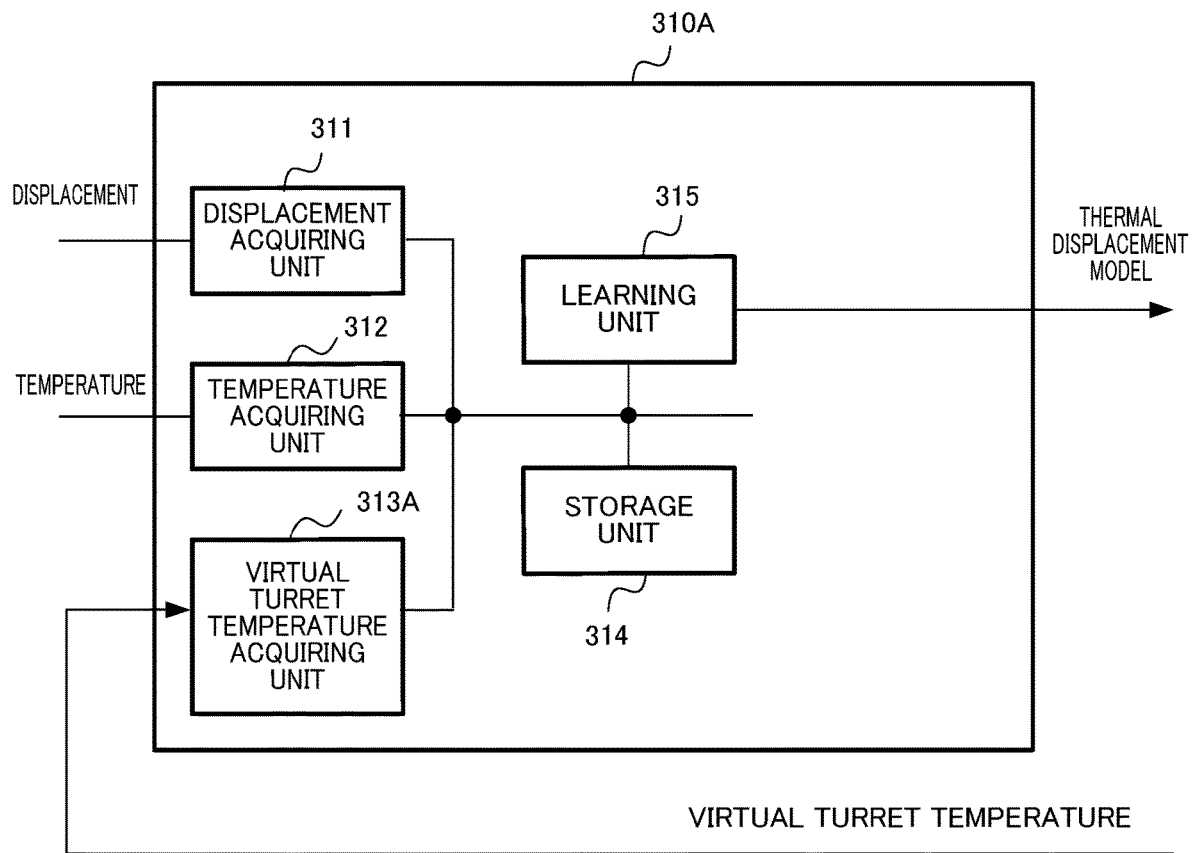
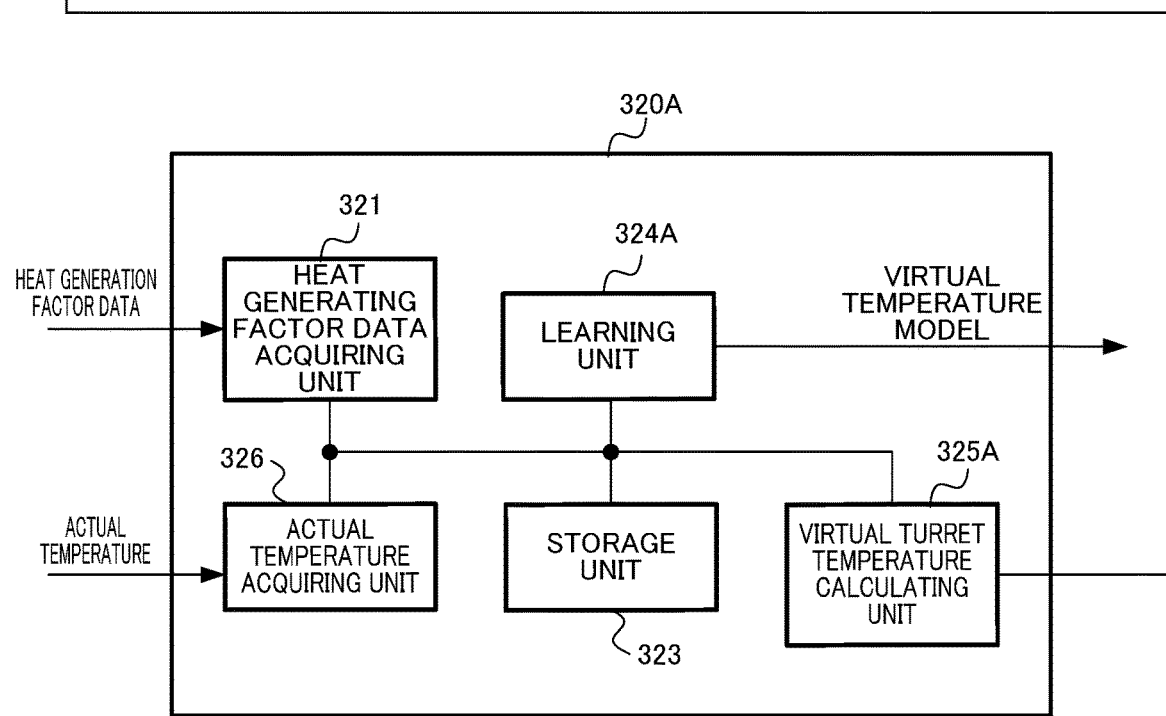

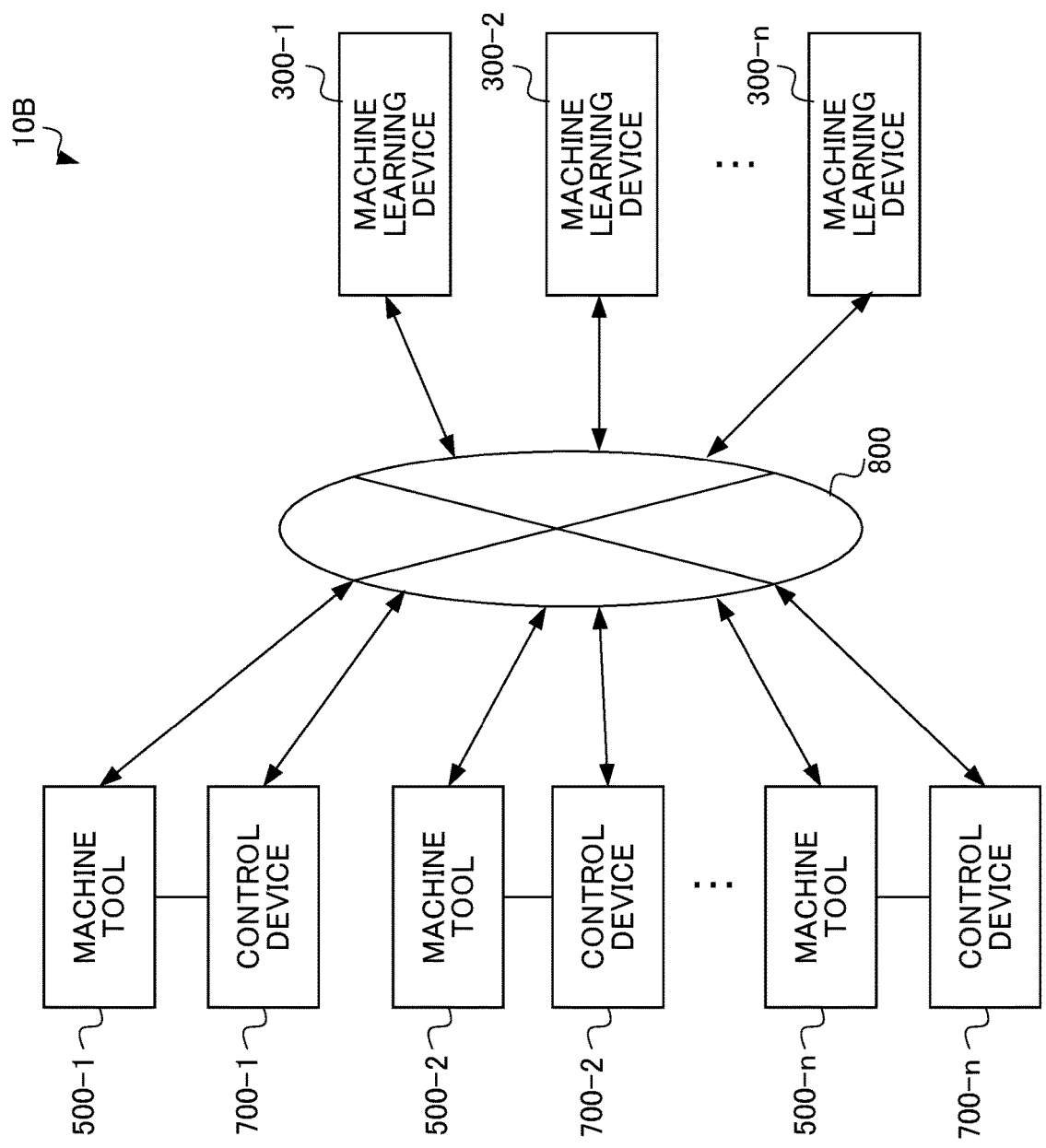

MACHINE LEARNING DEVICE, CONTROL SYSTEM, AND MACHINE LEARNING METHOD

This application is based on and claims the benefit of priority from Japanese Patent Application No. 2019-152822, filed on 23 Aug. 2019, the content of which is incorporated herein by reference.

BACKGROUND OF THE INVENTION

Field of the Invention

The present invention relates to a machine learning device that performs machine learning for calculating a virtual temperature model for estimating a temperature of a specific portion of a machine at which it is not possible to mount a temperature sensor, or a temperature of a specific portion of a machine at which it is difficult to mount a temperature sensor in actual operation even if it is possible to mount the temperature sensor at the time of data collection; a control system including the machine learning device; and a machine learning method.

Related Art

As one of the causes of machining errors in machine tools, there is a problem in that relative thermal displacement occurs between the tool and the workpiece due to thermal expansion of the machine element such as the spindle, ball screw, etc. of the machine tool. A machine learning device or a thermal displacement compensating device for solving such a problem is described in, for example, Japanese Unexamined Patent Application, Publication No. 2018-153901, Japanese Unexamined Patent Application, Publication No. 2015-199168, and Japanese Unexamined Patent Application, Publication No. 11-114776.

Japanese Unexamined Patent Application, Publication No. 2018-153901 describes a machine learning device. The machine learning device includes: a measurement data acquiring unit for acquiring a measurement data group; a thermal displacement amount acquiring unit for acquiring an actual measurement value of a thermal displacement amount of a machine element; a storage unit that defines the measurement data group acquired by the measurement data acquiring unit as input data and an actual measurement value of a thermal displacement amount of the machine element acquired by the thermal displacement amount acquiring unit as a label and stores them as training data in association with each other; and a calculation equation learning unit that sets a thermal displacement amount prediction calculation equation for calculating a thermal displacement amount of the machine element based on the measurement data group by performing machine learning based on the measurement data group and the actual measurement value of the thermal displacement amount of the machine element.

Japanese Unexamined Patent Application, Publication No. 2015-199168 discloses a thermal displacement compensating device. This thermal displacement compensating device assumes the spindle unit including a spindle as a two-dimensional model, divides this model into 12 sections, secures an area for storing the temperature of each section in the memory of the control device (the temperature of the section I at time N is defined as $T_{IN}$), sets the appropriate heat dissipation coefficient, the heat generation coefficient, and the heat conduction coefficient between the adjacent sections according to the number, the shape, and the size of the set section, and stores these coefficients in the memory of the control device. According to this thermal displacement compensating device, by grasping the spindle portion as a two-dimensional model, the load applied to the calculation is reduced, and furthermore, a thermal displacement compensating device of the machine is provided which can calculate the compensation amount that changes instantaneously in a narrower span.

Japanese Unexamined Patent Application, Publication No. H11-114776 describes a thermal displacement compensating device. The thermal displacement compensating device includes a neural network computing unit that receives temperature information from a temperature sensor 1 of each part of a machine tool and computes a compensation amount of thermal displacement between a tool and a workpiece using a neural network constant value. The thermal displacement compensating device causes the neural network learning calculating unit to learn the thermal displacement and temperature information read from the training data storage unit 8 as training data, thereby adjusting the neural network constant value.

Patent Document 1: Japanese Unexamined Patent Application, Publication No. 2018-153901
Patent Document 2: Japanese Unexamined Patent Application, Publication No. 2015-199168
Patent Document 3: Japanese Unexamined Patent Application, Publication No. H11-114776

SUMMARY OF THE INVENTION

There are portions of machine elements of machine tools, particularly the spindles and ball screws, where temperature sensors cannot be mounted despite their large effect on thermal displacement. When temperature data cannot be acquired using a temperature sensor, an estimation model of thermal displacement cannot be calculated, and thus, a high-precision estimation cannot be made. Furthermore, there are also portions where, although it is possible to mount a temperature sensor around a turret, a table, or the like, at the time of data collection, it is not possible to mount such a sensor if considering the actual operation. Therefore, the degree of freedom of expression of the estimation model is reduced.

According to a first aspect of the present disclosure, a machine learning device includes: a virtual temperature model calculating unit having a virtual temperature calculation equation including a first coefficient for determining a heat generation amount and a second coefficient for determining a heat dissipation amount, the virtual temperature model calculating unit configured to calculate virtual temperature data by estimating a temperature of a specific portion of a machine by the virtual temperature calculation equation using heat generation factor data; and a thermal displacement model calculating unit having a thermal displacement estimation amount calculation equation including a third coefficient, the thermal displacement model calculating unit configured to calculate, using the virtual temperature data calculated using the virtual temperature calculation equation and actual temperature data acquired from at least one temperature sensor mounted to a portion other than the specific portion, error between thermal displacement estimated by the thermal displacement estimation amount calculation equation and actually measured thermal displacement, and calculate an optimized thermal displacement estimation amount calculation equation by performing machine learning to search for the third coefficient so that the error is minimized, in which the virtual temperature model calculating unit calculates an optimized virtual temperature calculation equation by performing machine learning to search for the first coefficient and the second efficient so that error calculated by the thermal displacement estimation amount calculation equation that is optimized using the virtual temperature data estimated by the virtual temperature calculation equation is minimized.

According to a second aspect of the present disclosure, a machine learning device includes a virtual temperature model calculating unit having a virtual temperature calculation equation including a first coefficient for determining a heat generation amount and a second coefficient for determining a heat dissipation amount, in which the virtual temperature model calculating unit configured to calculate, using virtual temperature data of a specific portion of a machine acquired by the virtual temperature calculation equation using heat generation factor data and actual temperature data acquired from at least one temperature sensor mounted to the specific portion, calculate error between the virtual temperature data and the actual temperature data, and calculate an optimized virtual temperature calculation equation by performing machine learning to search for the first coefficient and the second coefficient so that the error is minimized.

According to a third aspect of the present disclosure, a control system includes: the machine learning device according to the first aspect; a thermal displacement compensating device configured to store a virtual temperature calculation equation and a thermal displacement estimation amount calculation equation outputted from the machine learning device, calculate, using virtual temperature data calculated from the virtual temperature calculation equation and actual temperature data acquired from at least one temperature sensor mounted to a portion other than a specific portion, an estimated value of thermal displacement by the thermal displacement estimation amount calculation equation, and calculate a thermal displacement compensation amount based on the estimated value of the thermal displacement; and a numerical control device configured to compensate a control command outputted to a motor control unit that controls a motor based on the thermal displacement compensation amount.

According to a fourth aspect of the present disclosure, a machine learning method of a machine learning device includes the steps of: calculating virtual temperature data by estimating a temperature of a specific portion of a machine using heat generation factor data by a virtual temperature calculation equation including a first coefficient for determining a heat generation amount and a second coefficient for determining a heat dissipation amount; calculating, using a thermal displacement estimation amount calculation equation including a third coefficient, and using the virtual temperature data calculated using the virtual temperature calculation equation and actual temperature data acquired from at least one temperature sensor mounted to a portion other than the specific portion, error between thermal displacement estimated by the thermal displacement estimation amount calculation equation and actually measured thermal displacement, and calculating an optimized thermal displacement estimation amount calculation equation by performing machine learning to search for the third coefficient so that the error is minimized; and calculating an optimized virtual temperature calculation equation by performing machine learning to search for the first coefficient and the second efficient so that error calculated by the thermal displacement estimation amount calculation equation that is optimized using the virtual temperature data estimated by the virtual temperature calculation equation is minimized.

According to a fifth aspect of the present disclosure, a machine learning method of a machine learning device includes the steps of: calculating, using virtual temperature data calculated using heat generation factor data from a virtual temperature calculation equation for estimating a temperature of a specific portion of a machine including a first coefficient for determining a heat generation amount and a second coefficient for determining a heat dissipation amount, and actual temperature data acquired from at least one temperature sensor mounted to the specific portion, error between the virtual temperature data and the actual temperature data; and calculating an optimized virtual temperature calculation equation by performing machine learning to search for the first coefficient and the second coefficient so that the error is minimized.

According to each aspect of the present disclosure, it is possible to estimate the temperature even if a temperature sensor cannot be mounted or even if it is difficult to mount the temperature sensor in actual operation. Furthermore, according to each aspect of the present invention, it is possible to calculate the thermal displacement amount of a component such as a spindle of the machine tool by using the estimated temperature.

BRIEF DESCRIPTION OF THE DRAWINGS

FIG. 5 is a block diagram showing the configuration of a virtual temperature model calculating unit and a thermal displacement model calculating unit;

FIG. 11 is a block diagram showing the configuration of a virtual temperature model calculating unit and a thermal displacement model calculating unit;

FIG. 14 is a block diagram showing another configuration example of a control system.

DETAILED DESCRIPTION OF THE INVENTION

Hereinafter, embodiments of the present disclosure will be described in detail with reference to the accompanying drawings.

First Embodiment

Figure 1:
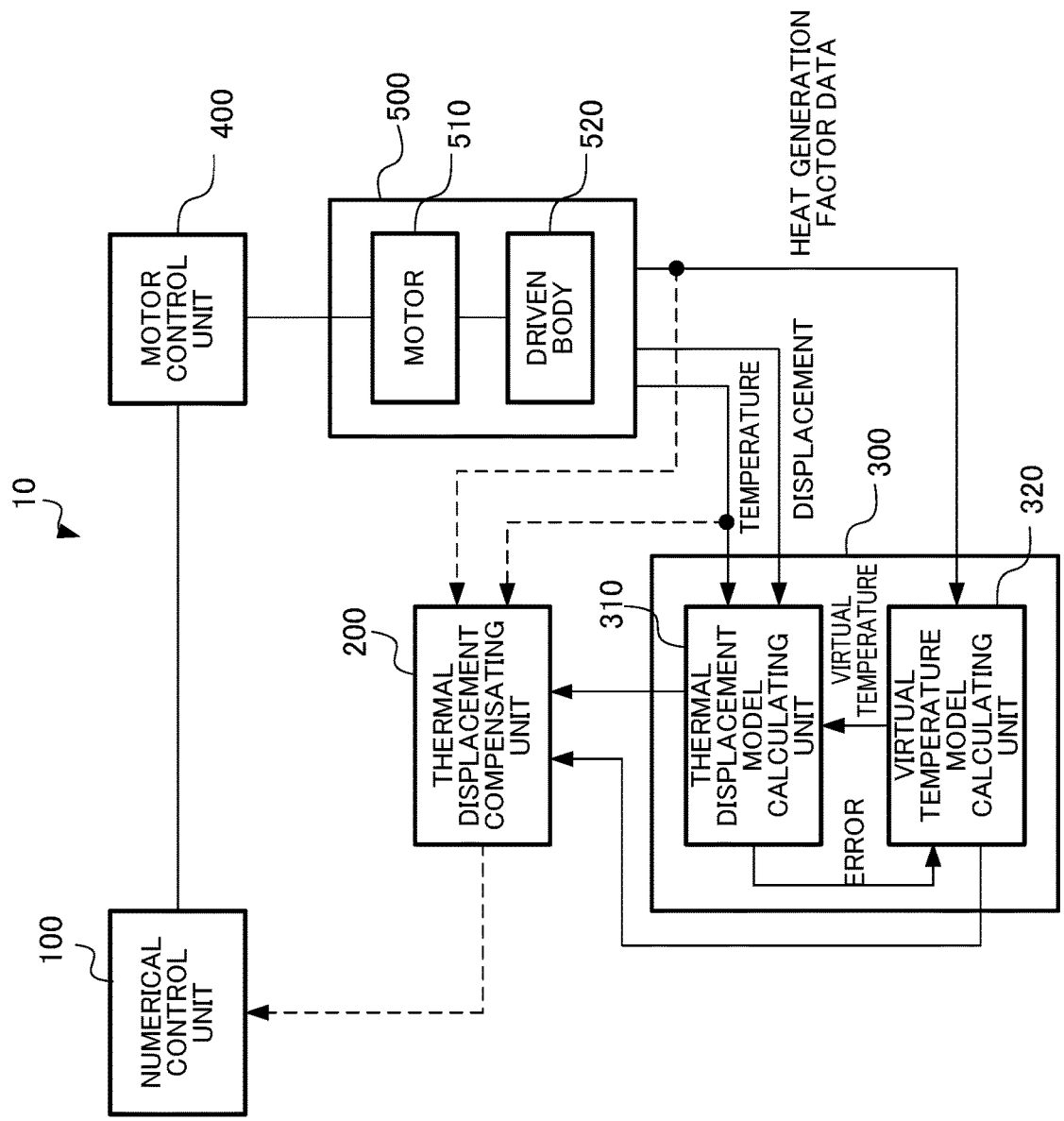
FIG. 1 is a block diagram showing the configuration of a control system according to a first embodiment of the disclosure at the time of machine learning.
Figure 2:
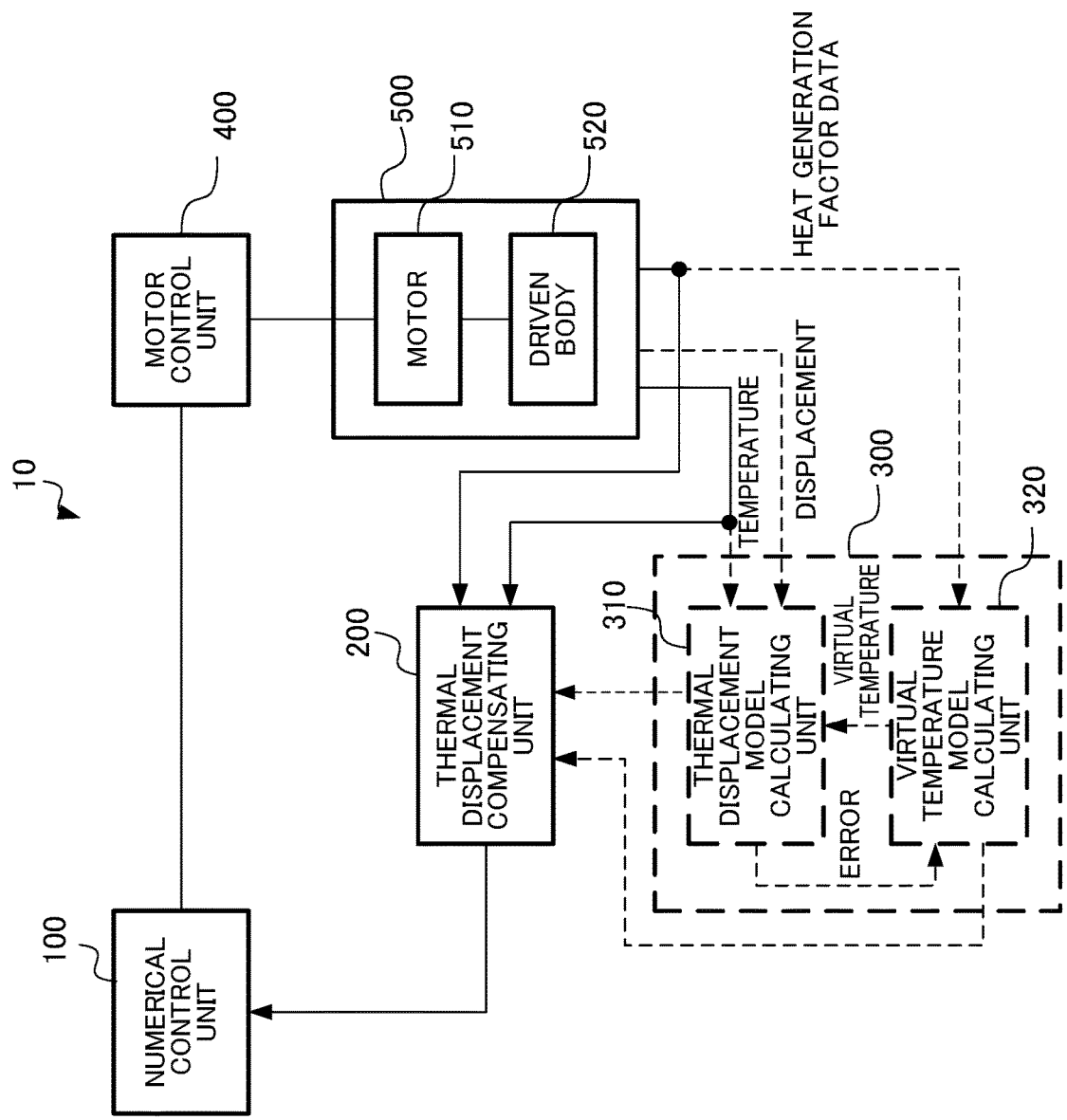
FIG. 2 is a block diagram showing the configuration of the control system according to the first embodiment of the disclosure at the time of operation.
Figure 3:
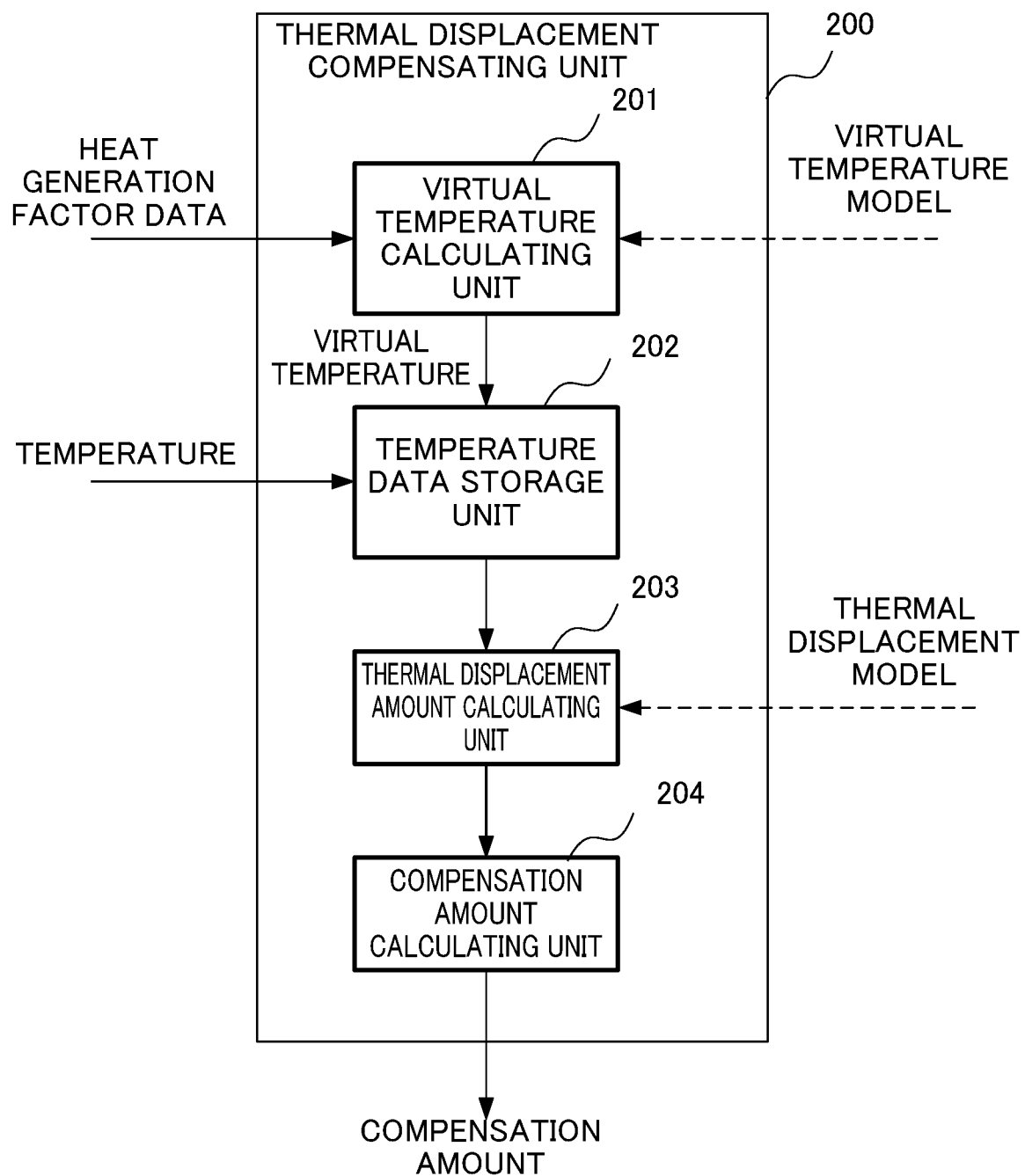
FIG. 3 is a block diagram showing the configuration of a thermal displacement compensating unit.
Figure 4:
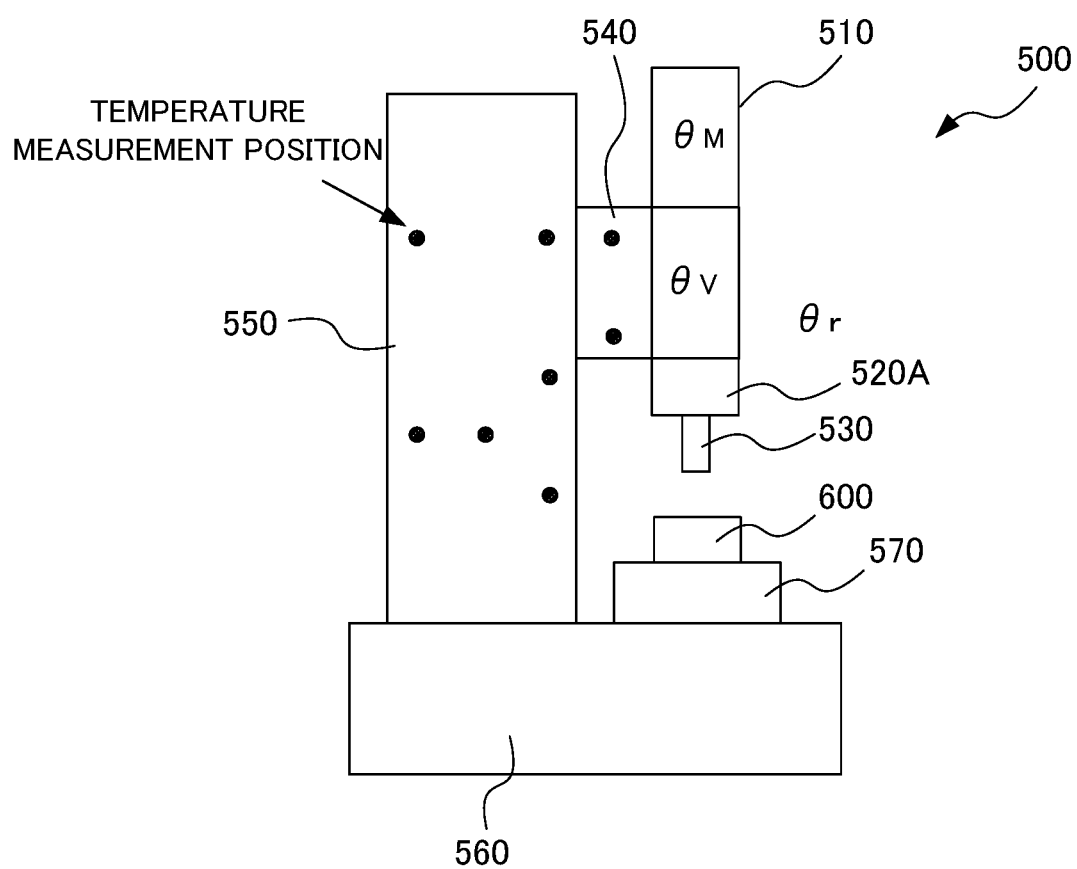
FIG. 4 is a configuration diagram showing a model of a machine tool including a spindle.

First, a control system including a machine learning device of the present disclosure will be described. FIG. 1 is a block diagram showing the configuration of a control system according to a first embodiment of the disclosure at the time of machine learning. FIG. 2 is a block diagram showing the configuration of the control system according to the first embodiment of this disclosure at the time of operation. FIG. 3 is a block diagram showing the configuration of a thermal displacement compensating unit. FIG. 4 is a configuration diagram showing a model of a machine tool including a spindle. FIG. 5 is a block diagram showing the configuration of a virtual temperature model calculating unit and a thermal displacement model calculating unit.

As shown in FIGS. 1 and 2, the control system 10 includes a numerical control unit 100 such as a CNC (Computerized Numerical Control) device, a thermal displacement compensating unit 200, a machine learning unit 300, and a motor control unit 400. The machine learning unit 300 includes a thermal displacement model calculating unit 310 and a virtual temperature model calculating unit 320. The thermal displacement compensating unit 200 may be included in the numerical control unit 100, and the motor control unit 400 may be included in the numerical control unit 100.

The control system 10 may be configured as one device including the numerical control unit 100, the thermal displacement compensating unit 200, the machine learning unit 300, and the motor control unit 400. However, the control system 10 may configure the numerical control unit 100, the thermal displacement compensating unit 200, the machine learning unit 300, and the motor control unit 400 as individual devices, and connect them to each other by a network. It should be noted that, even when the numerical control unit 100, the thermal displacement compensating unit 200, the machine learning unit 300, and the motor control unit 400 are configured as one device, they may be referred to as a numerical control device, a thermal displacement compensating device, a machine learning device, and a motor control device. The thermal displacement model calculating unit 310 and the virtual temperature model calculating unit 320 may be separated and provided as a machine learning unit, respectively.

The motor controlled by the motor control unit 400 is provided, for example, as part of a machine such as a machine tool, a robot, and an industrial machine. In FIGS. 1 and 2, the motor control unit 400 controls a motor 510 of a machine tool 500, and the motor 510 drives a driven body 520. Here, the driven body 520 refers to a spindle. The numerical control unit 100 and the motor control unit 400 may be provided as part of a machine such as the machine tool 500.

As shown in FIGS. 1 and 2, the numerical control unit 100 sends a control signal to the motor control unit 400. A machining program determined in accordance with the machining content of a workpiece is stored in the numerical control unit 100. The numerical control unit 100 reads and interprets the machining program to extract the conditions of the cutting process (e.g., frequency of acceleration and deceleration of the spindle, rotation number, cutting load, cutting time), and then outputs the position command data to the motor control unit 400. During operation, the numerical control unit 100 uses the compensation amount of the thermal displacement outputted from the thermal displacement compensating unit 200 to compensate for the conditions of the cutting process, and then outputs a position command data serving as a control command to the motor control unit 400.

As shown in FIG. 3, the thermal displacement compensating unit 200 includes a virtual temperature calculating unit 201, a temperature data storage unit 202, a thermal displacement calculating unit 203, and a compensation amount calculating unit 204. The virtual temperature calculating unit 201 receives and stores a virtual temperature model from the virtual temperature model calculating unit 320 of the machine learning unit 300 after the machine learning of the control system 10. The virtual temperature calculating unit 201 receives heat generation factor data (current, rotation velocity, load, etc.) from the machine tool 500 during operation of the control system 10, calculates the virtual temperature (estimated temperature) of the spindle by the virtual temperature model based on the heat generation factor data, and outputs the result to the temperature data storage unit 202. Since the spindle rotates, it is impossible to mount a temperature sensor to actually measure the spindle temperature. Therefore, the virtual temperature calculating unit 201 calculates the virtual temperature of the spindle by the virtual temperature model.

The temperature data storage unit 202 stores the virtual temperature (estimated temperature), and stores the temperature data outputted from the machine tool 500. The temperature data are actual temperature data that are actually measured using temperature sensors at portions other than the spindle.

The thermal displacement calculating unit 203 receives and stores the thermal displacement model from the thermal displacement model calculating unit 310 of the machine learning unit 300 after machine learning. The thermal displacement calculating unit 203 reads the temperature data and the virtual temperature from the temperature data storage unit 202 during operation of the control system 10, and calculates the thermal displacement estimation amount according to the temperature data including the virtual temperature and the thermal displacement model.

The compensation amount calculating unit 204 outputs the thermal displacement estimation amount as a compensation amount of the thermal displacement to the numerical control unit 100.

As shown in FIG. 4, the machine tool 500 includes a motor 510 serving as a spindle motor, a spindle 520A to which a tool 530 is mounted and which serves as a driven body 520 to be rotated by the motor 510, a mount 540 for mounting the spindle 520A, a column 550, a bed 560, and a reciprocating table 570. A workpiece 600 is machined by the tool 530 on the reciprocating table 570. FIG. 4 shows portions actually measured using temperature sensors at portions other than the spindle by black circles.

Machine Learning Unit 300

The machine learning unit 300 includes a thermal displacement model calculating unit 310 and a virtual temperature model calculating unit 320. The virtual temperature model calculating unit 320 learns the coefficient of a virtual spindle temperature calculation equation which is a virtual temperature model for calculating a virtual temperature (virtual spindle temperature) of a spindle in the machine tool 500 by reinforcement learning. The spindle becomes a specific part, and the virtual spindle temperature calculation equation becomes a virtual temperature calculation equation. Furthermore, the thermal displacement model calculating unit 310 of the machine learning unit 300 learns the coefficient of the thermal displacement estimation amount calculation equation which becomes a thermal displacement model for calculating an estimation amount (thermal displacement estimation amount) of the thermal displacement in the machine tool 500 by supervised learning.

More specifically, the thermal displacement model calculating unit 310 estimates the thermal displacement by the thermal displacement estimation amount calculation equation using the virtual spindle temperature outputted from the virtual temperature model calculating unit 320 and the actually measured temperature of portions other than the spindle (for example, the actually measured temperature of the locations denoted by the black circles of the mount 540 and the column 550 shown in FIG. 4). Furthermore, the thermal displacement model calculating unit 310 calculates error between the estimated thermal displacement and the actually measured thermal displacement, searches for a coefficient of the thermal displacement estimation amount calculation equation so that the error is minimized, and thereby calculates a thermal displacement estimation amount calculation equation. The virtual temperature model calculating unit 320 uses the heat generation factor data (current, rotation velocity, load, etc.) of the machine tool 500 to estimate the spindle temperature by the virtual spindle temperature calculation equation. Furthermore, the virtual temperature model calculating unit 320 learns the coefficient of the spindle temperature estimation equation so that the error outputted from the thermal displacement model calculating unit 310 is minimized. Thus, the machine learning unit 300 calculates the coefficient of the optimized spindle temperature estimation equation in which the error between the thermal displacement estimated by the thermal displacement estimation equation and the actually measured thermal displacement is minimized, and the coefficient of the optimized thermal displacement estimation amount equation, and outputs the results to the thermal displacement compensating unit 200 as the virtual temperature model and the thermal displacement model.

Hereinafter, the configuration of the thermal displacement model calculating unit 310 and the virtual temperature model calculating unit 320 will be described with reference to FIG. 5.

First, the virtual temperature model calculating unit 320 will be described below. The virtual temperature model calculating unit 320 includes the heat generation factor data acquiring unit 321, an error acquiring unit 322, a storage unit 323, a learning unit 324, and a virtual spindle temperature calculating unit 325.

The heat generation factor data acquiring unit 321 acquires heat generation factor data from the machine tool 500. Herein, the heat generation factor data refers to a driving current of the motor 510, the rotation velocity of the spindle of the machine tool 500, the load of the motor 510, the motor temperature, the atmosphere temperature, and the like.

The error acquiring unit 322 acquires error that is a difference between an estimated value of the thermal displacement amount and an actually measured value of the thermal displacement amount from the error calculating unit 316 of the thermal displacement model calculating unit 310 to be described later. The error outputted from the thermal displacement model calculating unit 310 will be described in the explanation of the thermal displacement model calculating unit 310.

In the storage unit 323, the heat generation factor data acquired by the heat generation factor data acquiring unit 321 and the error acquired by the error acquiring unit 322 are stored in association with each other.

The learning unit 324 reads the heat generation factor data and the error from the storage unit 323, and performs learning of the coefficients A, B, C, and D of the virtual spindle temperature calculation equation based on the heat generation factor data that has been read so that the error is minimized, thereby setting the virtual spindle temperature calculation equation for calculating the virtual spindle temperature based on the heat generation factor data. The virtual spindle temperature $\theta_V(t_i)$ at a certain time $t_i$ is expressed by Equation 1.

$$\theta_V(t_i) = \theta_V(t_{i-1}) + T_S \times Q'(t_{i-1}) - T_S \times A \times \{\theta_V(t_{i-1}) - \theta_r(t_{i-1})\} \quad \text{[Math. 1]}$$

$T_S$ in Equation 1 is the calculation period of the virtual spindle temperature, $Q'$ is an amount of heat generation, A is a coefficient, and $\theta_r(t_{i-1})$ is the ambient temperature at the previous time $t_{i-1}$.

The calorific value $Q'$ is expressed by Equation 2 below.

$$Q'(t_{i-1}) = B \times \{\theta_M(t_{i-1}) - \theta_V(t_{i-1})\} + \Sigma_{t'=0}^{TS}\{C \times S(t_{i-1}-t') + D \times S(t_{i-1}-t')^2\} \quad \text{[Math. 2]}$$

Figure 6:
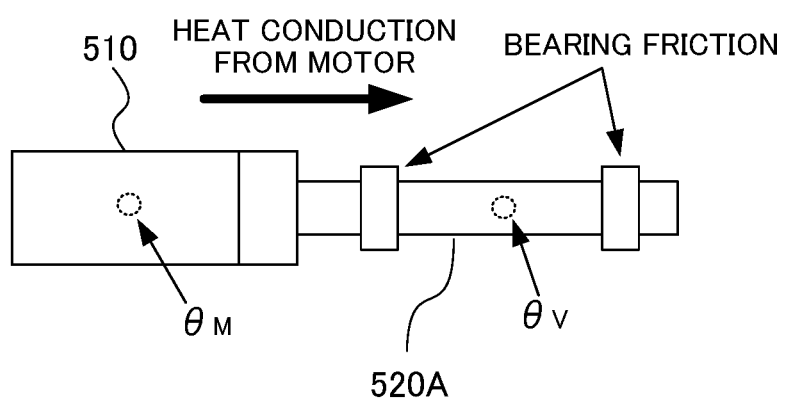
FIG. 6 is a diagram for explaining effects of heat conduction and bearing friction of a motor.

B in Equation 2 is the coefficient of heat conduction of the motor, C and D are the coefficients of bearing friction that becomes mechanical loss, $\theta_M(t_{i-1})$ is a motor temperature, and $S(t_{i-1}-t')$ is the spindle rotation velocity. The initial values of the coefficients A, B, C, and D are set in advance and modified by reinforcement learning to search for the coefficients A, B, C, and D. Coefficient A is a second coefficient for determining the amount of heat dissipation, and the coefficients B, C, and D are each a coefficient for determining the calorific value. As shown in FIG. 6, the spindle temperature $\theta_V(t_{i-1})$ is affected by the heat conduction of the motor and the bearing friction.

The virtual spindle temperature calculating unit 325 calculates the virtual spindle temperature from the heat generation factor data using the virtual spindle temperature calculation equations expressed by Equations 1 and 2 set by the learning unit 324.

Example of Reinforcement Learning

Hereinafter, reinforcement learning will be described below; however, reinforcement learning is already known. For example, the detailed description is provided in Japanese Unexamined Patent Application Publication Nos. 2018-152012, 2019-021024, 2019-021235, etc. Therefore, the following explanation will describe the outline of reinforcement learning.

The basic mechanism of reinforcement learning is that an agent observes the state of an environment and selects a certain action. The environment changes according to the action. As the environment changes, something is rewarded, and the agent learns to make better choices of action (decisions). The reward is often a fragmentary value based on changes in some parts of the environment. The agent learns to choose an action to maximize the total reward over the future.

Herein, any learning method can be used as the reinforcement learning. However, in the following explanation, a case of using Q learning, which is a method of learning the value $Q(S, A)$ of selecting the action A under the state S of a certain environment, will be described as an example. The purpose of Q learning is to select the action A having the highest value Q(S, A) as the optimal action from among the possible actions A in a certain state S.

However, at the time of starting the Q learning first, the correct value of the value Q(S, A) is completely unknown for the combination of the state S and the action A. Then, the agent selects various actions A under a certain state S, and learns the correct value Q(S, A) by selecting a better action based on the reward given to the action A at that time.

For example, the virtual temperature model calculating unit 320 of the machine learning unit 300 performs the above-described Q learning. Specifically, with the error outputted from the thermal displacement model calculating unit 310 and the heat generation factor data obtained from the machine tool 500 established as the state S, the virtual temperature model calculating unit 320 learns the value Q relative to this state S, selecting the adjustment of the coefficients A, B, C and D of the virtual spindle temperature calculation equation as the action A. In the virtual temperature model calculating unit 320, a reward is returned every time the action A is performed. This reward is determined based on the error. For example, the virtual temperature model calculating unit 320 searches for the optimal action A by trial and error so that the total of rewards over the future is maximized. In so doing, it is possible for the virtual temperature model calculating unit 320 to select the optimal action A (i.e., the coefficients A, B, C, and D of the virtual spindle temperature calculation equation) with respect to the state S, which is heat generation factor data.

In the calculation of the reward in the virtual temperature model calculating unit, for example, the absolute value of the error or the square of the absolute value of the error is used as the evaluation function f, and when the evaluation function value f(S') relating to the state S' modified by the action A becomes larger than the evaluation function f(S) before the modification relating to the state information S before the modification by the action information A, the value of the reward is set to a negative value; whereas, when the evaluation function value f(S') becomes smaller than the evaluation function f(S), the value of the reward is set to a positive value. If the evaluation function f(S') is equal to the evaluation function f(S), the value of the reward is set to zero. The value function is updated by performing Q learning based on the state S, the action A, the state S' when the action A is applied to the state S, and the value of the reward calculated as described above. Thereafter, based on the value function updated by performing Q learning, an action that maximizes the value function Q(S, A) is generated as an optimization action.

Next, the thermal displacement model calculating unit 310 will be described below. The thermal displacement model calculating unit 310 includes a displacement acquiring unit 311, a temperature acquiring unit 312, a virtual spindle temperature acquiring unit 313, a storage unit 314, a learning unit 315, and an error calculating unit 316.

The displacement acquiring unit 311 acquires an actually measured value of the thermal displacement amount of the spindle of the machine tool 500 detected by a probe, for example.

The temperature acquiring unit 312 acquires the actually measured temperature of portions other than the spindle measured by the temperature sensor, e.g., the actually measured temperature of the locations of the black circles shown in FIG. 4 of the mount 540 and the column 550.

The virtual spindle temperature acquiring unit 313 acquires the virtual spindle temperature calculated by the virtual spindle temperature calculating unit 325.

In the storage unit 314, an actually measured value of the thermal displacement amount acquired by the displacement acquiring unit 311, the actually measured temperature of portions other than the spindle acquired by the temperature acquiring unit 312, and the virtual spindle temperature acquired by the virtual spindle temperature acquiring unit 313 are stored in association with each other. Table 1 is a table showing the actually measured temperatures $\theta_1$ to $\theta_n$ and the virtual spindle temperature $\theta_V$ from the temperature sensors provided at the n-number of positions other than the spindle for time t.

TABLE 1

| TIME t | $\theta_1$ | $\theta_2$ | $\theta_3$ | ... | $\theta_{n-1}$ | $\theta_n$ | $\theta_V$ |
|---|---|---|---|---|---|---|---|
| $t_1$ | 21 | 22 | 31 | | 25 | 18 | 30 |
| $t_2$ | 22 | 24 | 32 | | 26 | 19 | 32 |
| ... | | | | | | | |

The learning unit 315 sets a thermal displacement estimation amount calculation equation that calculates an estimation amount (thermal displacement estimation amount) of thermal displacement based on the actually measured temperature of portions other than a spindle and a virtual spindle temperature by performing supervised learning based on the actually measured temperature of the portions other than the spindle and the virtual spindle temperature. More specifically, by multiple regression of the generalized linear model, based on the difference between the thermal displacement estimation amount calculated by substituting the actually measured temperature $\theta_1$ to $\theta_n$ from the temperature sensors provided at n portions other than the spindle within a predetermined period stored in the storage unit 314 and the virtual spindle temperature $\theta_V$, and the actually measured value of the thermal displacement amount of the spindle within a predetermined period stored as a label in the storage unit 13, the learning unit 315 sets an optimized thermal displacement estimation amount calculation equation so that the difference is minimized, for example, by the least squares method or the like. The thermal displacement estimation amount obtained based on the actually measured temperature $\theta_1$ to $\theta_n$ and the virtual spindle temperature $\theta_V$ is input data, the actually measured value of the thermal displacement is a label, and a set of the label and the input data is teacher data.

It should be noted that the learning unit 315 sets an optimized thermal displacement estimation amount calculation equation so that the difference between $f(\theta_2, \theta_2, \ldots, \theta_n, \theta_V)$ and $Y_L$ is minimized when the estimated value of the thermal displacement amount using the actually measured temperature $\theta_1$ to $\theta_n$ and the virtual spindle temperature $\theta_V$ from the temperature sensor provided at n portions other than the spindle is $f(\theta_2, \theta_2, \ldots, \theta_n, \theta_V)$ (where n is a natural number) and the actually measured value of the thermal displacement amount is $Y_L$.

The error calculating unit 316 outputs to the error acquiring unit 322 the difference between the thermal displacement estimation amount calculated by the thermal displacement estimation amount calculation equation set by the learning unit 315 and the actually measured value of the thermal displacement amount as error.

Example of Method of Machine Learning

The learning unit 315 performs machine learning using training data. An example of the method will be described in detail. An example of such a method is described in Japanese Unexamined Patent Application, Publication No. 2018-153901.

A method of setting a thermal displacement estimation amount calculation equation is described in, for example, Japanese Unexamined Patent Application, Publication No. 2018-153901. For example, as a method of searching for a coefficient of a thermal displacement estimation amount calculation equation and setting the thermal displacement estimation amount calculation equation, it is possible to estimate and set, based on multiple regression of the generalized linear model, a coefficient in which the square error between the estimated value of the thermal displacement amount calculated by the thermal displacement estimation amount calculation equation $Y=a_1\theta_1+a_2\theta_2+\ldots a_n\theta_n+a_V\theta_V$ (thermal displacement estimation amount) and the actually measured value $Y_L$ of the thermal displacement amount is minimized, by machine learning using the least squares method. Here, Y is a thermal displacement amount estimated value, $\theta_1, \theta_2, \ldots, \theta_n$ is an actually measured temperature, $\theta_v$ is a virtual spindle temperature, and $a_1, a_2, \ldots, a_n, a_V$ are coefficients determined by multiple regression.

More specifically, when the thermal displacement estimated value is Y, the label is $Y_L$, and the actually measured temperatures $\theta_1, \theta_2, \ldots, \theta_n$, and the virtual spindle temperature $\theta_v$ are input data, in Equation 3, a set of coefficients $a_k, a_v$ in which the summed value over a plurality of training data become minimum is calculated. It should be noted that k is a natural number, n is any integer, and k≤n. The coefficients $a_k$ and $a_v$ are third coefficients.

$$(Y_L-Y)^2=(Y_L-\Sigma_{k=1}{}^n a_k\theta_k-a_V\theta_V)^2 \quad \text{[Math. 3]}$$

The method of setting the thermal displacement estimation amount calculation equation is not limited to the above method, and various methods described in Japanese Unexamined Patent Application, Publication No. 2018-153901 can be used. For example, it is possible to perform multiple regression analysis giving consideration to an L2 regularization term, rather than normal multiple regression analysis. Furthermore, it is possible to perform sparse regularization. For example, it is possible to perform multiple regression analysis giving consideration to an L1 regularization term.

Furthermore, in Japanese Unexamined Patent Application, Publication No. 2018-153901, it is possible to use the first order delay element of the measurement data or the time shift element of the measurement data as the input data when executing the above-described machine learning. Japanese Unexamined Patent Application, Publication No. 2018-153901 discloses a thermal displacement amount prediction calculation equation using the first order delay element of measurement data, and a thermal displacement amount prediction equation using the time shift element of the measurement data.

Furthermore, Japanese Unexamined Patent Application, Publication No. 2018-153901 also describes another method whereby it is possible to perform machine learning by a well-known neural network such as a single-layer neural network or a multilayer neural network.

Operation During Machine Learning

Figure 7:
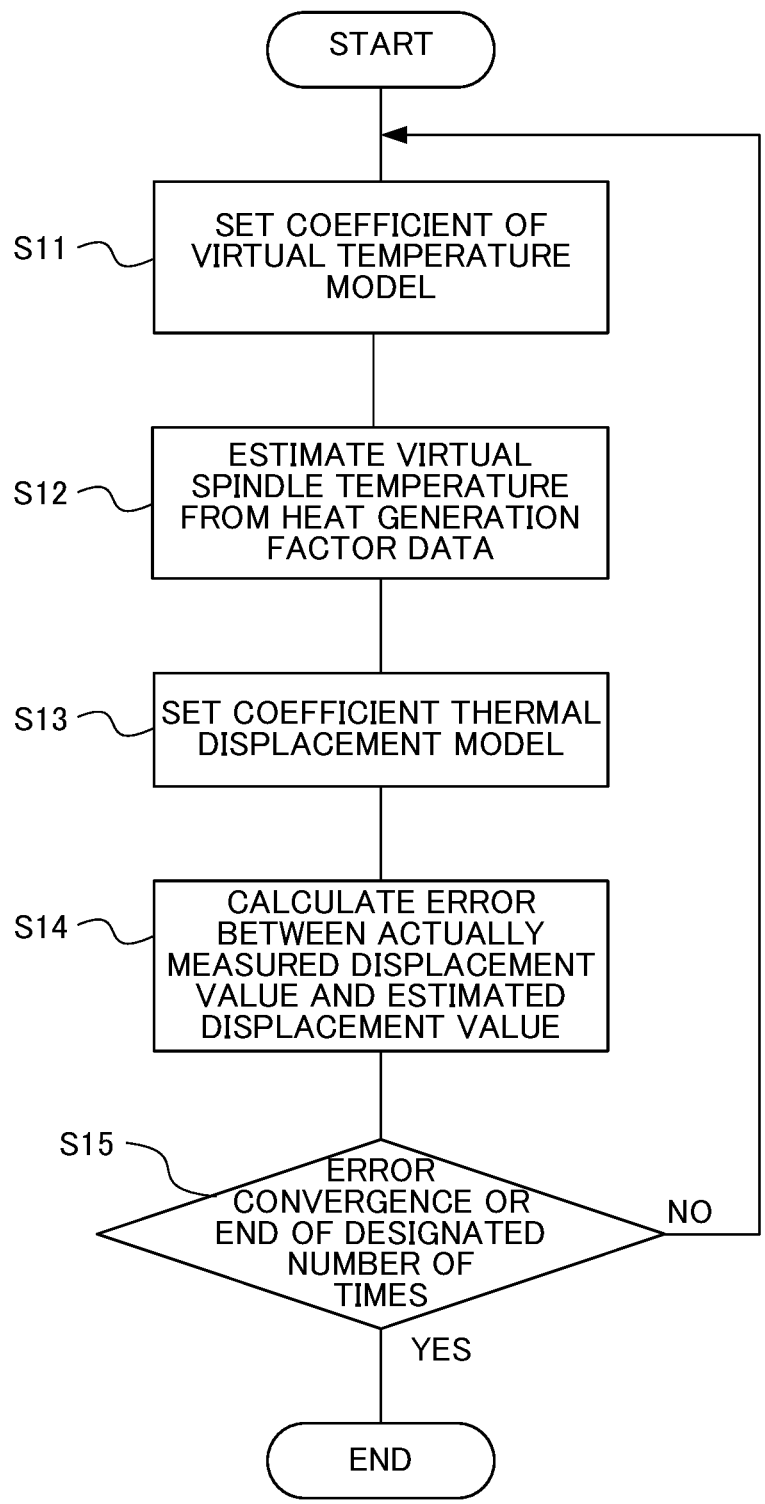
FIG. 7 is a flowchart showing operation of a machine learning unit 300 at the time of machine learning.

Next, the operation during machine learning in the machine learning unit 300 according to the present embodiment will be described. FIG. 7 is a flowchart illustrating an operation of the machine learning unit 300 at the time of machine learning.

In Step S11, the learning unit 324 of the virtual temperature model calculating unit 320 randomly sets the coefficients A, B, C, and D of the virtual spindle temperature calculation equation serving as a virtual temperature model at the start of machine learning and during machine learning.

In Step S12, the heat generation factor data acquiring unit 321 acquires the heat generation factor data such as the motor temperature $\theta_M$, the spindle rotation velocity 5, the ambient temperature $\theta_r$, and the like from the machine tool 500. The virtual spindle temperature calculating unit 325 calculates the virtual spindle temperature by using the virtual spindle temperature calculation equations for which the coefficients are set by the learning unit 324, that is, by using Equations 1 and 2.

In Step S13, the learning unit 315 of the thermal displacement model calculating unit 310 sets the coefficient of the thermal displacement estimation amount calculation equation so that the difference (error) between the estimated value $f(\theta_1, \theta_2, \ldots, \theta_n, \theta_V)$ of the thermal displacement amount using the virtual spindle temperature and the actually measured temperature from the temperature sensor provided at portions other than the spindle, and the actually measured value $Y_L$ of the thermal displacement amount is minimized.

In Step S14, when the estimated value of the thermal displacement amount is set as $f(\theta_1, \theta_2, \ldots, \theta_n, \theta_V)$ (n is a natural number), and the actually measured value of the thermal displacement amount is $Y_L$, the error calculating unit 316 calculates the error between $f(\theta_2, \theta_2, \ldots, \theta_n, \theta_V)$ and $Y_L$.

In Step S15, if the error acquired from the error calculating unit 316 does not converge, or if the search for the coefficients A, B, C, and D is less than a specified number of times, the processing returns to Step S11. On the other hand, if the error converges and the error disappears, or falls within a certain range, or if the search for the coefficients A, B, C, and D reaches a specified number of times by the specified number of times, the learning unit 324 of the virtual temperature model calculating unit 320 ends learning, and outputs the virtual temperature model to the thermal displacement compensating unit 200. The virtual temperature model that outputs at the end of learning is a virtual temperature model using the coefficients A, B, C, and D of the combination in which the error was minimized in the search process. The thermal displacement model is outputted from the learning unit 315 of the thermal displacement model calculating unit 310 to the thermal displacement compensating unit 200.

It should be noted that the storage unit 314 and the storage unit 323 of the machine learning unit 300 store the virtual spindle temperature calculation equation and the thermal displacement estimation amount calculation equation. Thus, when the virtual spindle temperature calculation equation and the thermal displacement estimation amount calculation equation are requested from the newly installed thermal displacement compensating unit 200, it is possible to send the virtual spindle temperature calculation equation and the thermal displacement estimation amount calculation equation to the thermal displacement compensating unit. If new training data is acquired, it is possible to perform additional machine learning therewith.

Effects Achieved by First Embodiment

As described above, in the present embodiment, it is possible to estimate a temperature even when a temperature sensor cannot be mounted to actually measure the temperature. Furthermore, it is possible to calculate the thermal displacement estimation amount of the components such as the spindle of the machine tool using the estimated temperature.

Second Embodiment

In the first embodiment, a machine learning device is described which performs machine learning to learn the first coefficient for determining an amount of heat generation of the virtual spindle temperature calculation equation for calculating a virtual spindle temperature and the second coefficient for determining the amount of heat dissipation, and uses the virtual spindle temperature thus calculated as a parameter to perform machine learning to learn a coefficient of the thermal displacement estimation amount calculation equation for determining a thermal displacement estimation amount. In the present embodiment, a machine learning device will be described which performs machine learning to learn the first coefficient for determining an amount of heat generation of a virtual turret temperature calculation equation for determining a virtual turret temperature and the second coefficient for determining the amount of heat dissipation, and uses the virtual turret temperature thus calculated as a parameter to calculate a coefficient of a thermal displacement estimation amount calculation equation for calculating a thermal displacement estimation amount. A turret refers to a tool rest that turns (mounting two or more tools radially).

Since the spindle rotates, it is impossible to mount a temperature sensor to actually measure the spindle temperature. On the one hand, in actual operation, it is not possible to mount a temperature sensor to the turret. However, it is possible to mount a temperature sensor to the turret at the time of data collection. Therefore, in the case of performing machine learning to learn the first coefficient for determining an amount of heat generation of the virtual turret temperature calculation equation for calculating the virtual turret temperature and the second coefficient for determining the amount of heat dissipation, it is possible to use an actually measured value of the turret temperature.

Figure 12:
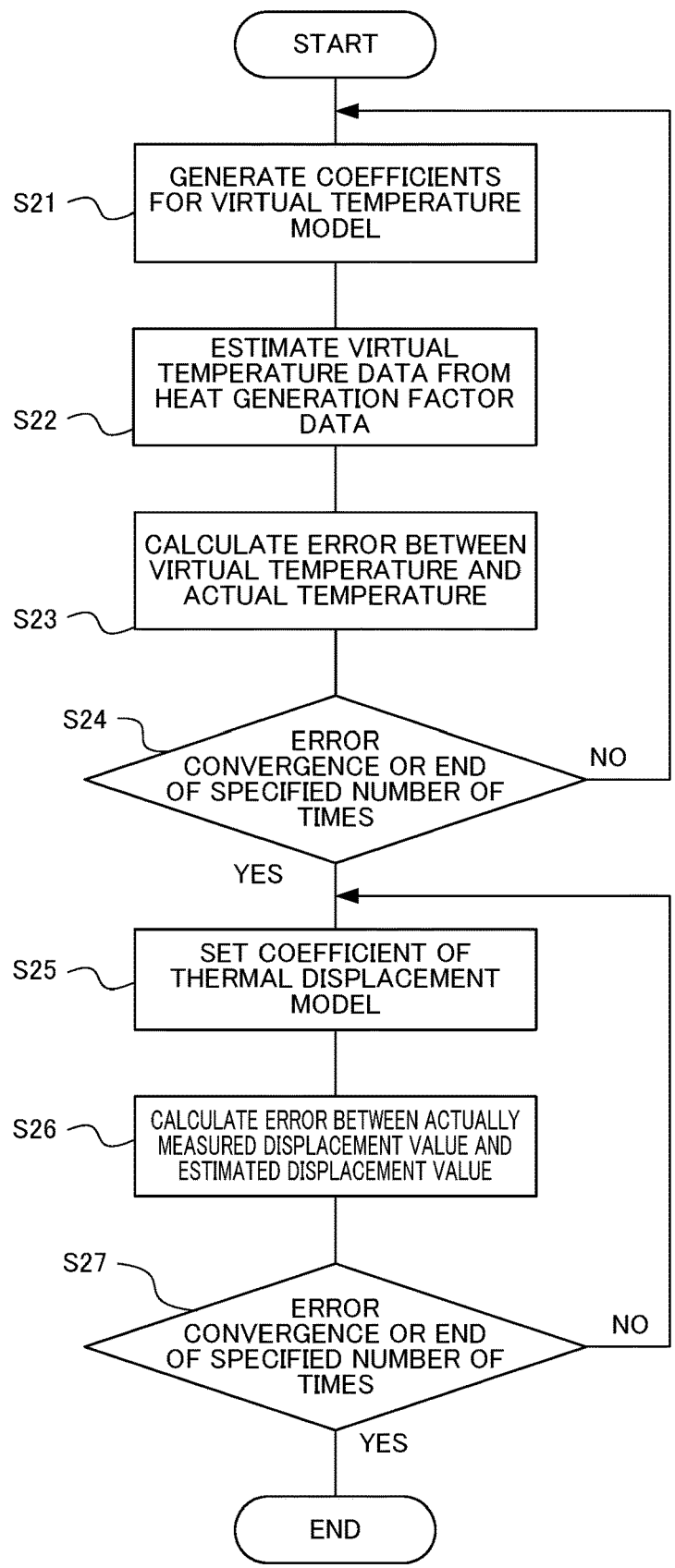
FIG. 12 is a flowchart showing operation of a machine learning unit 300A at the time of machine learning.

Even in the present embodiment, as shown in Steps S25 to S27 of FIG. 12, which will be described later, the thermal displacement model calculating unit calculates error between an actually measured value of thermal displacement and a thermal displacement estimated value, and searches for a coefficient of the thermal displacement estimation amount calculation equation, thereby calculating a thermal displacement model; however, the present invention is not limited thereto. For example, the thermal displacement model calculating unit may set a coefficient of the thermal displacement estimated value calculation equation to calculate a thermal displacement model. In this case, Steps S26 and S27 of FIG. 12 described later are unnecessary. Similar to the first embodiment, it is possible for the method of setting the coefficient of the thermal displacement estimation amount equation to estimate and set, based on multiple regression of the generalized linear model, a coefficient in which the square error between the estimated value of the thermal displacement amount calculated by the thermal displacement estimation amount calculation equation $Y = a_1\theta_1 + a_2\theta_2 + \ldots a_n\theta_n + a_V\theta_{VL}$ (thermal displacement estimation amount) and the actually measured value $Y_L$ of the thermal displacement amount is minimized by machine learning using the least squares method. Here, Y is a thermal displacement amount estimate value, $\theta_1, \theta_2, \ldots, \theta_n$ is an actually measured temperature, $\theta_{VL}$ is a virtual turret temperature, and $a_1, a_2 \ldots a_n$, $a_V$ are coefficients determined by multiple regression. It should be noted that the virtual turret temperature $\theta_{VL}$ is a virtual turret temperature calculated by a virtual turret temperature calculation equation optimized by learning in the virtual temperature model calculating unit 320A, which will be described later.

Figure 8:
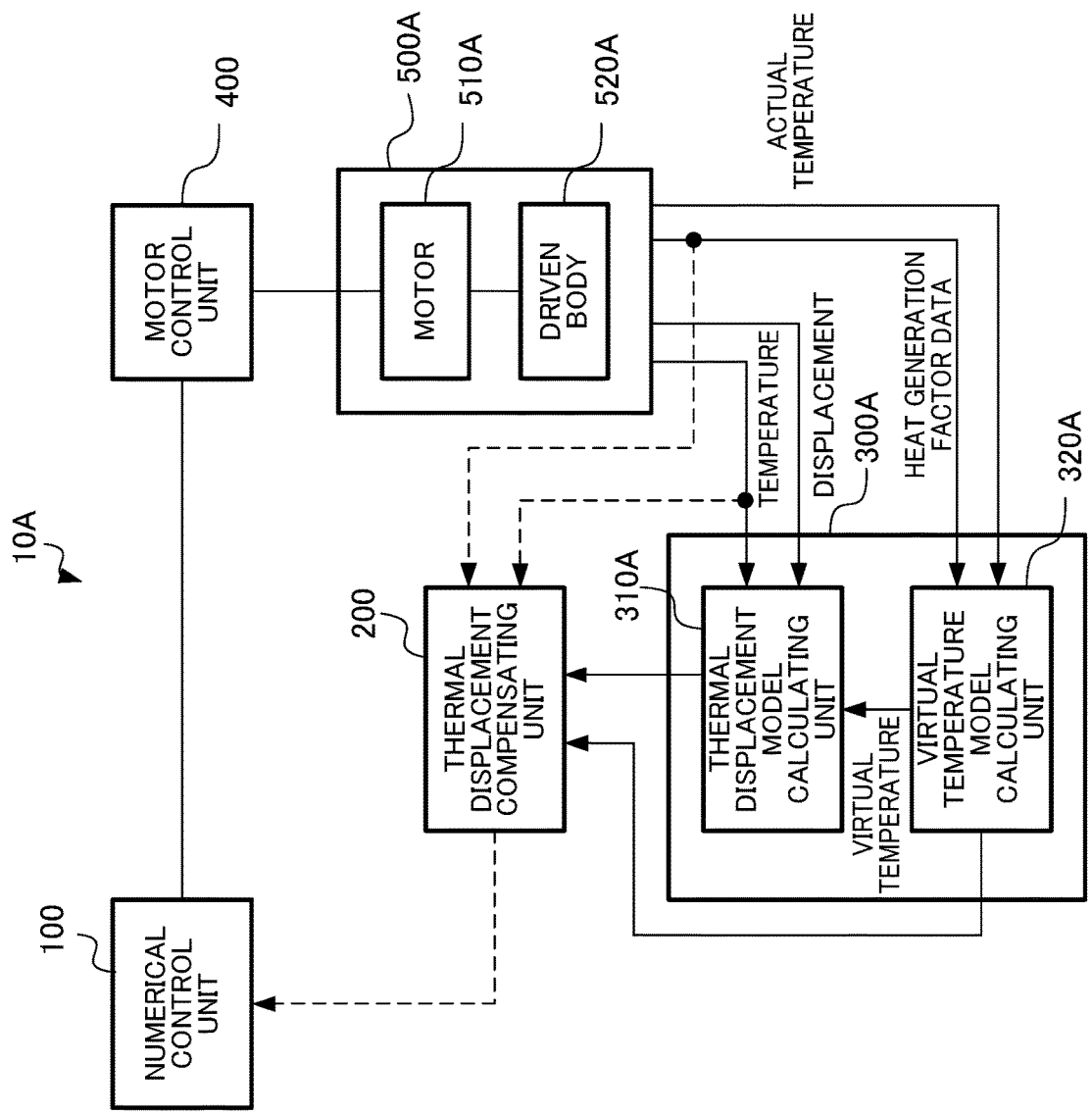
FIG. 8 is a block diagram showing the configuration of a control system according to a second embodiment of the disclosure at the time of machine learning.
Figure 9:
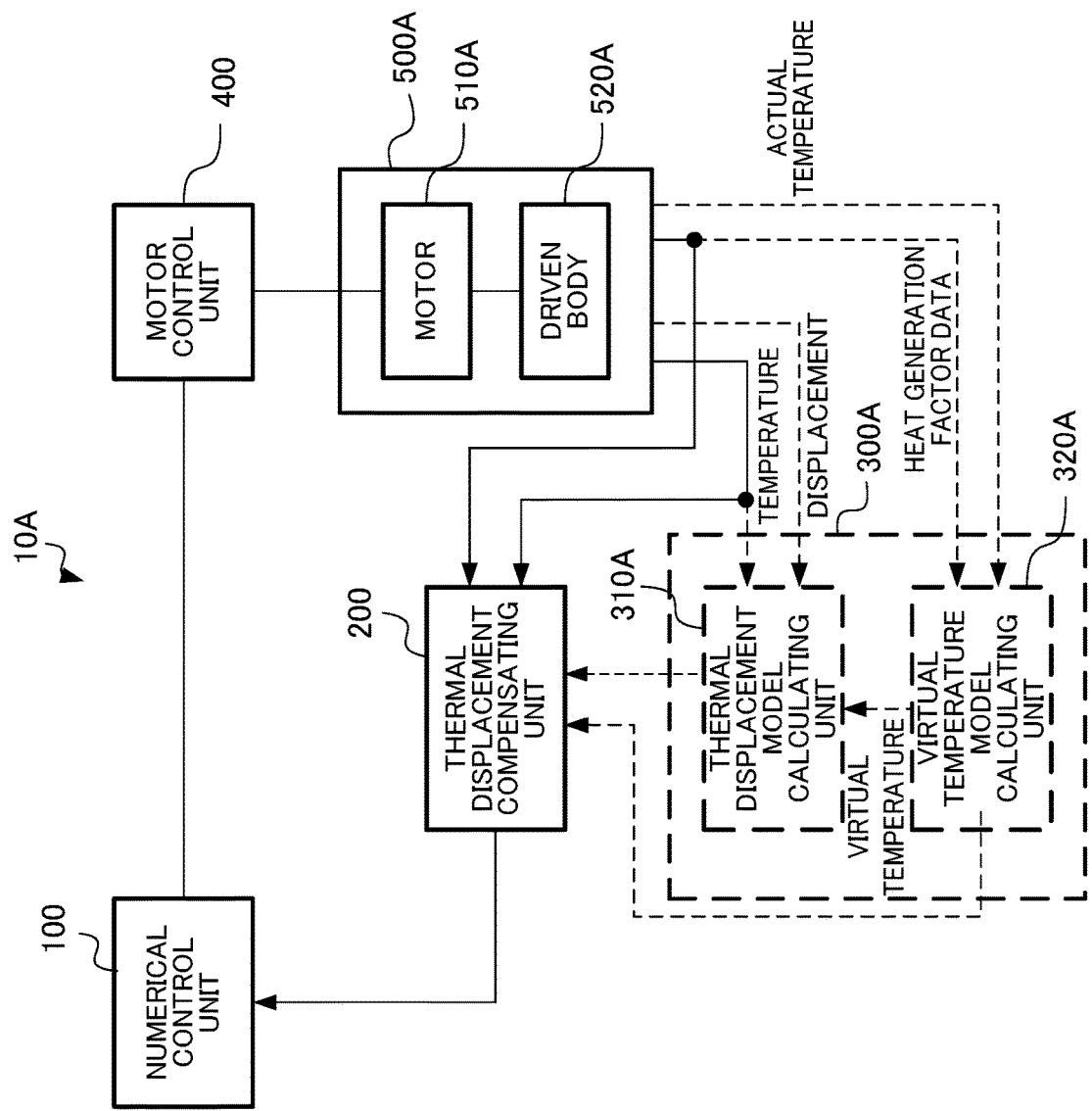
FIG. 9 is a block diagram showing the configuration of a control system according to the second embodiment of the disclosure at the time of operation.
Figure 10:
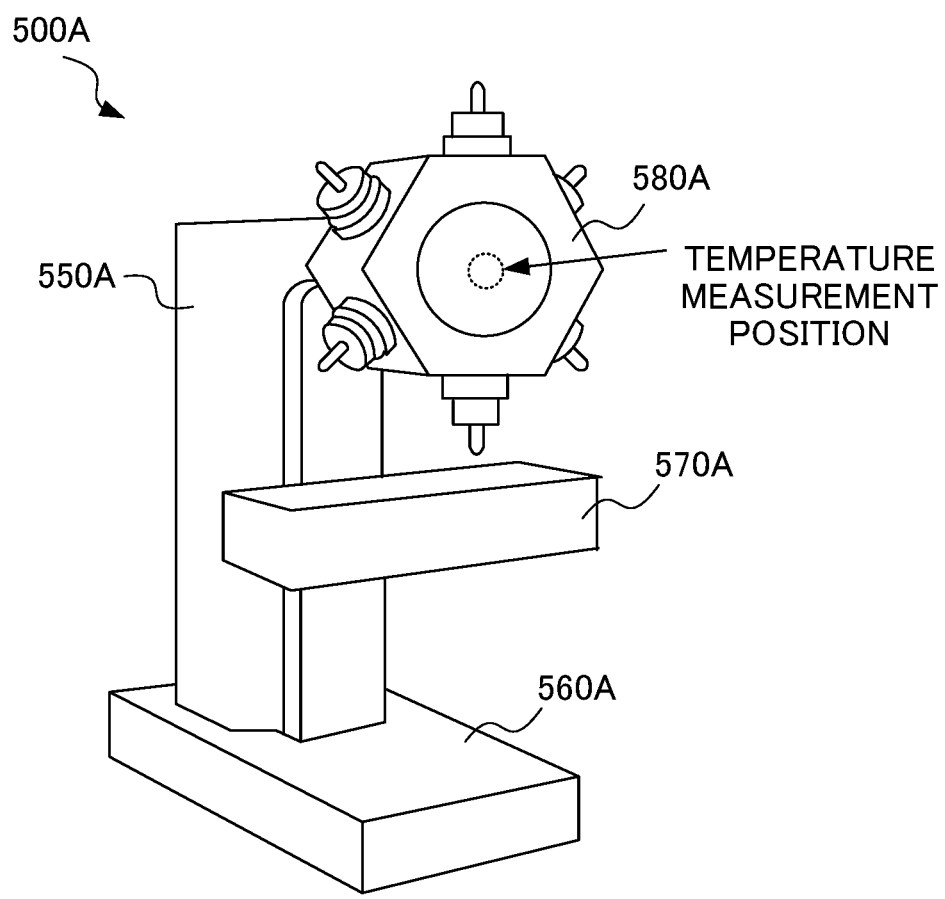
FIG. 10 is a block diagram showing a model of a machine tool including a turret.

FIG. 8 is a block diagram showing the configuration of a control system according to the second embodiment of this disclosure at the time of machine learning. FIG. 9 is a block diagram showing the configuration of the control system according to the second embodiment of this disclosure at the time of operation. FIG. 10 is a block diagram showing a model of a machine tool including a turret. FIG. 11 is a block diagram showing the configuration of a virtual temperature model calculating unit and a thermal displacement model calculating unit.

As shown in FIGS. 8 and 9, in a control system 10A of the present embodiment, the actual temperature is inputted to a virtual temperature model calculating unit 320A from a temperature sensor mounted to a turret of a machine tool 500. In the control system 10 shown in FIGS. 1 and 2, the error is inputted from the thermal displacement model calculating unit 310 to the virtual temperature model calculating unit 320. However, in the present embodiment, the error is not inputted from the thermal displacement model calculating unit 310A to the virtual temperature model calculating unit 320A. The machine learning unit 300A does not necessarily include the thermal displacement model calculating unit 310A, and may include only the virtual temperature model calculating unit 320A.

In the thermal displacement model calculating unit 310A of the machine learning unit 300A, as compared with the thermal displacement model calculating unit 310, the virtual spindle temperature is replaced with the virtual turret temperature. Therefore, the virtual spindle temperature acquiring unit 313 is replaced with the virtual turret temperature acquiring unit 313A, and the error calculating unit 316 is not provided. Except for these points, the configuration and operation of the thermal displacement model calculating unit 310A are the same as those of the thermal displacement model calculating unit 310. Therefore, descriptions thereof are omitted. Furthermore, the method of performing machine learning to learn a coefficient of the thermal displacement estimation amount calculation equation of the thermal displacement model calculating unit 310A is the same as the method of performing machine learning to learn a coefficient of the thermal displacement estimation amount calculation equation of the thermal displacement model calculating unit 310. Therefore, a description thereof is omitted. Table 2 is a table showing the actually measured temperatures $\theta_1$ to $\theta_n$ from temperature sensors provided at n portions other than the turret, and the virtual turret temperature $\theta_{VL}$ for time t stored in the storage unit 314.

TABLE 2

| TIME t | $\theta_1$ | $\theta_2$ | $\theta_3$ | . . . | $\theta_{n-1}$ | $\theta_n$ | $\theta_{VL}$ |
|---|---|---|---|---|---|---|---|
| $t_1$ | 21 | 22 | 31 | | 25 | 18 | 35 |
| $t_2$ | 22 | 24 | 32 | | 26 | 19 | 37 |
| . . . | | | | | | | |

As compared with the virtual temperature model calculating unit 320, in the virtual temperature model calculating unit 320A of the machine learning unit 300A, the error acquiring unit 322 is replaced with the actual temperature acquiring unit 326, and the virtual spindle temperature calculating unit 325 is replaced with the virtual turret temperature calculating unit 325A. The virtual temperature model calculating unit 320A includes a heat generation factor data acquiring unit 321, an actual temperature acquiring unit 326, a storage unit 323, a learning unit 324A, and a virtual turret temperature calculating unit 325A.

The heat generation factor data acquiring unit 321 acquires heat generation factor data from the machine tool 500. Here, the heat generation factor data refers to a driving current of the motor 510, the rotation velocity of the spindle of the machine tool 500, the load of the motor 510, the motor temperature, the atmosphere temperature, and the like.

The actual temperature acquiring unit 326 acquires the actually measured temperature of the turret measured by the temperature sensor, e.g., the actually measured temperature of the temperature measurement position in the broken line area of the turret shown in FIG. 10. As shown in FIG. 10, a machine tool 500A having a turret includes a turret 580A, a column 550A to which the turret 580A is mounted, a bed 560A, and a reciprocating table 570A. A motor is provided in the turret 580A. The broken line area of the turret is a specific portion.

In the storage unit 323, a heat generation factor data acquired by the heat generation factor data acquiring unit 321 and an actual temperature data of the turret acquired by the actual temperature acquiring unit 326 are stored in association with each other. Table 3 is a table showing the actually measured temperature $\theta_T$ from the temperature sensor provided in the turret and the virtual turret temperature $\theta_V$ for time t.

TABLE 3

| TIME t | $\theta_T$ | $\theta_V$ |
|---|---|---|
| $t_1$ | 35 | 30 |
| $t_2$ | 38 | 32 |
| ... | | |

The learning unit 324A acquires error between the virtual turret temperature data acquired using the heat generation factor data and the actual temperature data of the turret. The learning unit 324A performs supervised learning so that the error converges, thereby searching for a coefficient of a virtual turret temperature calculation equation for calculating the virtual turret temperature based on the heat generation factor data, and sets a virtual turret temperature calculation equation. The heat generation factor data is input data, the actual temperature data of the turret is a label, and a pair of the label and the input data is training data. The virtual turret temperature $\theta_V(t_i)$ at a certain time $t_i$ is represented by Equation 4 below in which the virtual spindle temperature is replaced with the virtual turret temperature.

$$\theta_V(t_i) = \theta_V(t_{i-1}) + T_S \times Q'(t_{i-1}) - T_S \times E \times \{\theta_V(t_{i-1}) - \theta_r(t_{i-1})\} \quad [\text{Math. 4}]$$

$T_S$ in Equation 4 is a calculation period of the turret temperature, Q' is an amount of heat generation, E is a coefficient, and $\theta_r(t_{i-1})$ is the ambient temperature at the previous time $t_{i-1}$. The calorific value Q' is indicated by Equation 5. It should be noted that other factors may be added to the calorific value Q'.

$$Q'(t_{i-1}) = F \times \{\text{LOAD}\} + G \times \{\text{SPINDLE ROTATION VELOCITY}\} + H \times \{\text{MOTOR TEMPERATURE}\} \quad [\text{Math. 5}]$$

F of Equation 5 is a coefficient of load on the motor, G is a coefficient of the spindle rotation velocity, and H is a coefficient of the motor temperature. Coefficient E is the second coefficient for determining the amount of heat dissipation, and the coefficients F, G, and H are coefficients for determining the calorific value. The coefficients E, F, G, and H are set in advance, and the learning unit 324A searches for coefficients E, F, G, and H in which the error between the time series data of the calculated virtual turret temperature $\theta_V$ and the data of the actual temperature $\theta_T$ of the turret is minimized.

As a method of searching for the coefficient of the virtual turret temperature calculation equation and setting the virtual turret temperature calculation equation, for example, the method described in Japanese Unexamined Patent Application, Publication No. 2018-153901 can be used. This method is a technique described in the technique of setting the thermal displacement estimation amount calculation equation in the first embodiment. More specifically, as a method of searching for the coefficient of the virtual turret temperature calculation equation, it is possible to estimate and set, based on multiple regression of the generalized linear model, the coefficients E, F, G, and H in which the square error ($=(\theta_T-\theta_V)2$) between the virtual turret temperature $\theta_V$ calculated by the virtual turret temperature calculation equation of Equation 4 and the actually measured temperature $\theta_T$ is minimized, by machine learning using the least squares method.

The method of setting the virtual turret temperature calculation equation is not limited to the above-mentioned method, and similarly to the method of setting the thermal displacement estimation amount calculation equation in the first embodiment, which has already been described, various methods described in Japanese Unexamined Patent Application, Publication No. 2018-153901 can be used.

The optimized virtual turret temperature calculation equation having the searched coefficients E, F, G, and H is outputted to the thermal displacement compensating unit 200 as a virtual temperature model.

The virtual turret temperature calculating unit 325A uses the virtual turret temperature calculation equation having the searched coefficients E, F, G, and H which are set by the learning unit 324A to calculate the virtual turret temperature $\theta_{VL}$. The virtual turret temperature acquiring unit 313A of the thermal displacement model calculating unit 310A acquires the virtual turret temperature $\theta_{VL}$ from the virtual turret temperature calculating unit 325A.

Operation of Machine Learning

Next, the operation during machine learning in the machine learning unit 300A according to the present embodiment will be described. FIG. 12 is a flowchart showing the operation of the machine learning unit 300A at the time of machine learning.

In Step S21, the learning unit 324A of the virtual temperature model calculating unit 320A randomly sets the coefficients E, F, G, and H of the virtual turret temperature calculation equation serving as the virtual temperature model at the start of machine learning and during machine learning.

In Step S22, the heat generation factor data acquiring unit 321 acquires the rotation velocity of the spindle, the load on the motor 510, and the heat generation factor data such as the motor temperature from the machine tool 500A. The learning unit 324A applies the heat generation factor data to the virtual turret temperature calculation equation, and calculates (estimates) the virtual turret temperature (virtual temperature data).

In Step S23, the learning unit 324A calculates the error between the virtual turret temperature and the actual temperature acquired from the actual temperature acquiring unit 326.

In Step S24, if the error does not converge, or if the search for the coefficients E, F, G, and H is less than a specified number of times, the processing returns to Step S21. On the other hand, if the error converges and the error disappears, or falls within a certain range, or if the search for the coefficients E, F, G, and H reaches a specified number of times by the specified number of times, the learning unit 324A ends learning. The virtual turret temperature calculating unit 325A uses the virtual turret temperature calculation equation in which the coefficients E, F, G, and H are set by the learning unit 324A (i.e., uses Equations 4 and 5) to calculate the virtual turret temperature $\theta_{VL}$. The virtual turret temperature calculation equation after learning is outputted to the thermal displacement compensating unit 200 as a virtual temperature model.

In Step S25, the learning unit 315 of the thermal displacement model calculating unit 310A sets the coefficient of the thermal displacement estimation amount calculation equation such that the difference between the virtual turret temperature $\theta_{VL}$ and the estimated value $f(\theta_1, \theta_2, \ldots, \theta_n, \theta_{VL})$ of the thermal displacement amount using the actually measured temperatures $\theta_1$ to $\theta_n$ from the temperature sensors provided at portions other than the turret, and the actually measured value $Y_L$ of the thermal displacement amount is minimized.

In Step S26, when the estimated value of the thermal displacement amount is set as $f(\theta_2, \theta_2, \ldots, \theta_n, \theta_{VL})$ (n is a natural number), and the actually measured value of the thermal displacement amount is $Y_L$, the learning unit 315 calculates the error between $f(\theta_1, \theta_2, \ldots, \theta_n, \theta_{VL})$ and $Y_L$.

In Step S27, if the error does not converge, or if the search for the coefficient is less than the specified number of times, the processing returns to Step S25. On the other hand, if the error converges and the error disappears, or if the error falls within a certain range, or if the search for the coefficient reaches the specified number of times by the specified number of times, the learning unit 315 ends learning and outputs the thermal displacement model to the thermal displacement compensating unit 200.

It should be noted that the storage unit 314 and the storage unit 323 of the machine learning unit 300A store a virtual turret temperature calculation equation and a thermal displacement estimation amount calculation equation. Thus, when the virtual turret temperature calculation equation and the thermal displacement estimation amount calculation equation are requested from the newly installed thermal displacement compensating unit 200, it is possible to send the virtual turret temperature calculation equation and the thermal displacement estimation amount calculation equation to the thermal displacement compensating unit. If new training data is acquired, it is possible to perform additional machine learning therewith.

Effect Achieved by Second Embodiment

As described above, in the present embodiment, it is possible to estimate the temperature when a temperature sensor cannot be mounted in actual operation, even though it is possible to mount the temperature sensor at the time of data collection. Furthermore, it is possible to calculate the thermal displacement estimation amount of the components such as the spindle of the machine tool using the estimated temperature.

The functional blocks included in the machine learning units 300 and 300A of the first and second embodiments have been described above. In order to realize these functional blocks, the machine learning units 300 and 300A each include an arithmetic processing unit such as a CPU (Central Processing Unit). The machine learning units 300 and 300A also include an auxiliary storage device such as a HDD (Hard Disk Drive) that stores application software, various control programs such as OS (Operating System), and the like, and a main storage device such as RAM (Random Access Memory) that stores data that is temporarily required for the arithmetic processing unit to execute the programs.

Furthermore, in the machine learning units 300 and 300A, the arithmetic processing unit reads the application software and the OS from the auxiliary storage device, and performs arithmetic processing based on the application software and the OS, while expanding the read application software and the OS in the main storage device. Furthermore, the arithmetic processing unit controls various kinds of hardware provided in each device based on the calculation result. As a result, the functional blocks of the present embodiment are realized. That is, the present embodiment can be realized by the cooperation of hardware and software. It should be noted that the thermal displacement compensating unit may include the machine learning unit 300 or the machine learning unit 300A. In this case, the arithmetic processing unit such as a CPU (Central Processing Unit), the auxiliary storage unit, and the main storage unit are shared, and need not be provided to the machine learning unit 300 or the machine learning unit 300A, respectively.

Since the machine learning units 300 and 300A have a large computational complexity associated with machine learning, for example, a GPU (Graphics Processing Unit) may be built into a personal computer. Furthermore, the GPU may be configured to be used for arithmetic processing associated with machine learning by a technique called GPGPU (General-Purpose computing on Graphics Processing Unit). This configuration enables high-speed processing. Furthermore, for faster processing, a computer cluster may be constructed using a plurality of computers equipped with such a GPU, and parallel processing may be performed by a plurality of computers included in the computer cluster.

Figure 13:
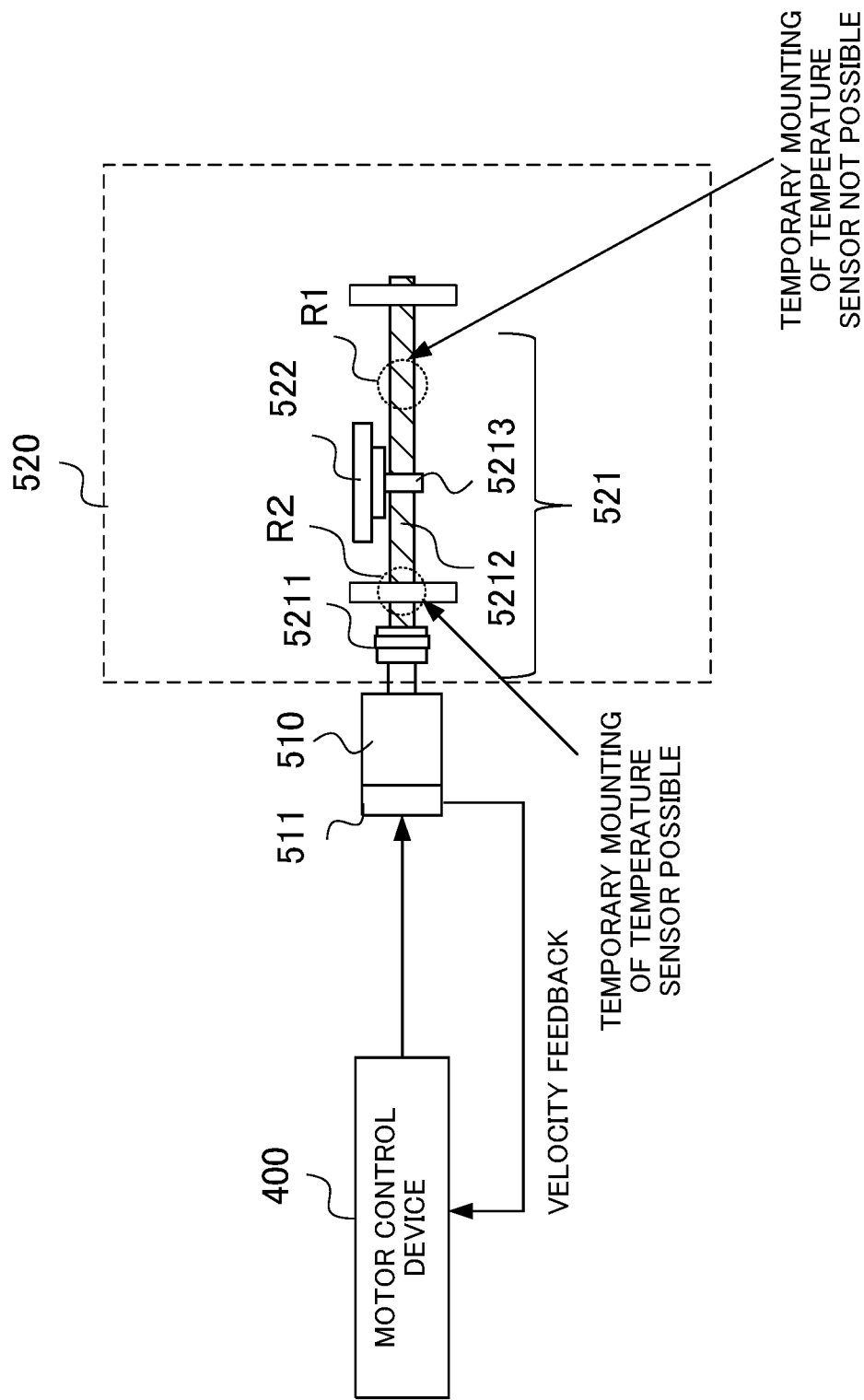
FIG. 13 is a configuration diagram showing a part of a machine tool including a ball screw.

In the first and second embodiments, a machine tool has been described as an example of the machine. However, in particular, the machine is not limited to a machine tool, and may be a robot, an industrial machine, or the like. In the first embodiment, the spindle is exemplified as an example in which it is impossible to mount a temperature sensor to actually measure the spindle temperature. In the second embodiment, the turret is exemplified as an example in which a temperature sensor cannot be mounted in actual operation; however, it is possible to mount the temperature sensor at the time of data collection. However, the present invention is not limited to these examples. For example, the present invention is also applicable to a ball screw as the driven body shown in FIG. 13. FIG. 13 is a configuration diagram showing a part of a machine tool including a ball screw. FIG. 13 is a block diagram showing a part of a machine tool including a motor and a ball screw. The motor control unit 400 machines a workpiece installed on the table 522 by causing the table 522 to move using the motor 510 through a coupling mechanism 521 of the driven body 520. The coupling mechanism 521 includes a coupling 5211 coupled to the motor 510, and a ball screw 5212 fixed to the coupling 5211, and a nut 5213 is threaded to the ball screw 5212. The rotational angular position of the motor 510 is detected by a rotary encoder 511 associated with the motor 510. The detection velocity determined by the rotational angle position (actual velocity) is subjected to velocity feedback (velocity FB) to the motor control unit 400. In the screw axis of the ball screw 5212, it is not possible to mount a temperature sensor in the region R1 of the screw axis due to the rotation, and thus, it is not possible to actually measure the temperature. Therefore, the configuration of the first embodiment can be applied. Furthermore, in the region R2 of the bearing of the screw axis of the ball screw 5212, although it is possible to mount a temperature sensor at the time of data collection, it is not possible to mount the temperature sensor in actual operation. Therefore, the configuration of the second embodiment can be applied.

Each component included in the machine learning unit can be realized by hardware, software, or a combination thereof. The machine learning method performed by the cooperation of the respective components included in the above-mentioned machine learning part can also be realized by hardware, software, or a combination thereof. Herein, being realized by software means being realized by a computer reading and executing a program.

Programs can be stored on any of various types of non-transitory computer readable media and provided to a computer. The non-transitory computer readable media include various types of tangible storage media. Examples of non-transient computer-readable media include magnetic recording media (e.g., hard disk drives), magnetic-optical recording media (e.g., magnetic-optical disks), CD-ROM (Read Only Memory), CD-R, CD-R/W, and semiconductor memory (e.g., mask ROM, PROM (Programmable ROM), EPROM (Erasable PROM, flash ROM, and RAM (random access memory)). The programs may be provided to a computer by using any of various types of transitory computer readable media.

Although the above-described embodiments are preferred embodiments of the present invention, they are not intended to limit the scope of the present invention only to the above-described embodiments, and it is possible to implement embodiments in a form in which various modifications are made without departing from the gist of the present invention.

In addition to the configurations of FIGS. 1 and 2, and FIGS. 8 and 9, there are also other configurations of the control system as described below.

Modification Example in which Machine Learning Device is Provided Outside Control System Via Network FIG. 14 is a block diagram showing another configuration example of a control system. A control system 10B shown in FIG. 14 differs from the control system 10 shown in FIG. 1 and FIG. 2 and the control system 10A shown in FIG. 8 and FIG. 9 in that n-number (where n is a natural number of 2 or more) of machine learning devices 300-1 to 300-n are connected to n-number of control devices 700-1 to 700-n and machine tools 500-1 to 500-n through a network 800. Each of the control devices 700-1 to 700-n includes the numerical control unit 100, the thermal displacement compensating unit 200, and the motor control unit 400 shown in FIGS. 1 and 2, or FIGS. 8 and 9. Each of the machine learning devices 300-1 to 300-n has the same configuration as that of the machine learning unit 300 or the machine learning unit 300A shown in FIG. 5.

Herein, the control device 700-1 and the machine tool 500-1, and the machine learning device 300-1 are a one-to-one group and are communicably connected. The control devices 700-2 to 700-n and the machine tools 500-2 to 500-n, and the machine learning devices 300-2 to 300-n are connected in a similar manner to the connection of the control device 700-1 and the machine tool 500-1, and the machine learning device 300-1. In FIG. 12, n-number of groups of the control devices 700-1 to 700-n and the machine tools 500-1 to 500-n, and the machine learning devices 300-1 to 300-n are connected via a network 800; however, they may be directly connected via connection interfaces. The n-number of groups of the control devices 700-1 to 700-n and the machine tools 500-1 to 500-n, and the machine learning devices 300-1 to 300-n may be installed in multiple sets, for example, in the same factory, or may be installed in different factories, respectively.

It should be noted that the network 800 is, for example, a LAN (Local Area Network) constructed in the factory, the Internet, a public telephone network, or a combination thereof. There is no particular limitation on the communication through the network 800 in terms of a specific communication system or in terms of whether the communication is established via wires or without wires.

Degree of Freedom of System Configuration

In the above-described embodiments, the control devices 700-1 to 700-n and the machine tools 500-1 to 500-n, and the control devices 700-1 to 700-n and the machine tools 500-1 to 500-n are respectively connected in one-to-one groups to communicate with each other; however, for example, one machine learning device may be communicably connected to a plurality of control devices and machine tools via the network 800 to perform machine learning for the plurality of control devices and the machine tools. In this case, each function of one machine learning device may be distributed to a plurality of servers as appropriate to establish a distributed processing system. In addition, each function of one machine learning device may be realized by using a virtual server function or the like on a cloud.

In addition, in a case in which there are n-number of machine learning devices 300-1 to 300-n corresponding to the same model names of n-number of machines, the same specifications, or the same series of control devices 700-1 to 700-n and machine tools 500-1 to 500-n, respectively, it may be configured so that the learning results in each machine learning device 300-1 to 300-n are shared with each other. By doing so, it is possible to construct a more optimal model.

A machine learning device, a control system, and a machine learning method according to the present disclosure can be adopted in various embodiments having the following configurations including the above-described embodiments. (1) According to the first aspect of the present disclosure, a machine learning device (for example, the machine learning unit 300) includes a virtual temperature model calculating unit (the virtual temperature model calculating unit 320) having a virtual temperature calculation equation including a first coefficient for determining a heat generation amount and a second coefficient for determining a heat dissipation amount, the virtual temperature model calculating unit (320) configured to calculate virtual temperature data by estimating a temperature of a specific portion of a machine by the virtual temperature calculation equation using heat generation factor data; and a thermal displacement model calculating unit (the thermal displacement model calculating unit 310) having a thermal displacement estimation amount calculation equation including a third coefficient, the thermal displacement model calculating unit (310) configured to calculate, using the virtual temperature data calculated using the virtual temperature calculation equation and actual temperature data acquired from at least one temperature sensor mounted to a portion other than the specific portion, error between thermal displacement estimated by the thermal displacement estimation amount calculation equation and actually measured thermal displacement, and calculate an optimized thermal displacement estimation amount calculation equation by performing machine learning to search for the third coefficient so that the error is minimized, in which the virtual temperature model calculating unit (320) calculates an optimized virtual temperature calculation equation by performing machine learning to search for the first coefficient and the second efficient so that error calculated by the thermal displacement estimation amount calculation equation that is optimized using the virtual temperature data estimated by the virtual temperature calculation equation is minimized. According to the machine learning device of the first aspect of the present disclosure, even when there is a portion to which a temperature sensor cannot be mounted to actually measure the temperature, it is possible to estimate the temperature of the portion. Furthermore, it is possible to calculate the thermal displacement estimation amount of the components of the machine using the estimated temperature.

(2) The machine learning device according to (1) above, in which the first coefficient is a coefficient for determining a heat generation amount according to heat conduction from a motor that drives the machine and/or a coefficient for determining a heat generation amount according to bearing friction, and the second coefficient is a coefficient for determining a heat dissipation amount according to heat transfer from the specific portion of the machine to a fluid therearound.

(3) The machine learning device according to (1) or (2) above, in which the specific portion of the machine is a spindle (for example, the spindle 520A) of a machine tool.

(4) The machine learning device according to (1) or (2) above, in which the specific portion of the machine is a screw axis of a ball screw of the machine tool).

(5) According to the second aspect of the present disclosure, a machine learning device (for example, a machine learning unit 300A) includes a virtual temperature model calculating unit (for example, the virtual temperature model calculating unit 320A) having a virtual temperature calculation equation including a first coefficient for determining a heat generation amount and a second coefficient for determining a heat dissipation amount, In which the virtual temperature model calculating unit configured to calculate, using virtual temperature data of a specific portion of a machine (500A) acquired by the virtual temperature calculation equation using heat generation factor data and actual temperature data acquired from at least one temperature sensor mounted to the specific portion, calculate error between the virtual temperature data and the actual temperature data, and calculate an optimized virtual temperature calculation equation by performing machine learning to search for the first coefficient and the second coefficient so that the error is minimized. According to the machine learning device of the second aspect of the present disclosure, it is possible to estimate the temperature of the portion even when there is a portion to which a temperature sensor cannot be mounted in actual operation, even though it is possible to mount the temperature sensor at the time of data collection.

(6) The machine learning device according to (5) above further includes a thermal displacement model calculating unit having a thermal displacement estimation amount calculation equation including a third coefficient, in which the thermal displacement model calculating unit is configured to calculate an optimized thermal displacement estimation amount calculation equation by performing machine learning using virtual temperature data calculated using the virtual temperature calculation equation that is optimized and actual temperature data acquired from at least one temperature sensor mounted to a portion other than the specific portion.

(7) The machine learning device according to (5) or (6), in which the specific portion of the machine is a turret of a machine tool.

(8) According to the third aspect of the present disclosure, a control system (for example, the control system 10, 10A) includes: the machine learning device (the machine learning unit 300, 300A) according to any one of (1), (2), (3), (4), (6), and (7); a thermal displacement compensating device (the thermal displacement compensating device 200) configured to store a virtual temperature calculation equation and a thermal displacement estimation amount calculation equation outputted from the machine learning device (300, 300A), calculate, using virtual temperature data calculated from the virtual temperature calculation equation and actual temperature data acquired from at least one temperature sensor mounted to a portion other than a specific portion, an estimated value of thermal displacement by the thermal displacement estimation amount calculation equation, and calculate a thermal displacement compensation amount based on the estimated value of the thermal displacement; and a numerical control device (100) configured to compensate a control command outputted to a motor control unit (400) that controls a motor (510) based on the thermal displacement compensation amount. According to the control system of the third aspect of the present disclosure, it is possible to estimate the temperature even if a temperature sensor cannot be mounted or it is difficult to mount the temperature sensor in actual operation.

(9) According to the fourth aspect of the present disclosure, a machine learning method of a machine learning device (the machine learning unit 300) includes the steps of: calculating virtual temperature data by estimating a temperature of a specific portion of a machine using heat generation factor data by a virtual temperature calculation equation including a first coefficient for determining a heat generation amount and a second coefficient for determining a heat dissipation amount; calculating, using a thermal displacement estimation amount calculation equation including a third coefficient, and using the virtual temperature data calculated using the virtual temperature calculation equation and actual temperature data acquired from at least one temperature sensor mounted to a portion other than the specific portion, error between thermal displacement estimated by the thermal displacement estimation amount calculation equation and actually measured thermal displacement, and calculating an optimized thermal displacement estimation amount calculation equation by performing machine learning to search for the third coefficient so that the error is minimized; and calculating an optimized virtual temperature calculation equation by performing machine learning to search for the first coefficient and the second efficient so that error calculated by the thermal displacement estimation amount calculation equation that is optimized using the virtual temperature data estimated by the virtual temperature calculation equation is minimized. According to the machine learning method of the fourth aspect of the present disclosure, even when there is a portion to which a temperature sensor cannot be mounted to actually measure the temperature, it is possible to estimate the temperature of the portion. Furthermore, it is possible to calculate the thermal displacement estimation amount of the components of the machine using the estimated temperature.

(10) According to the fifth aspect of the present disclosure, a machine learning method of a machine learning device (the machine learning unit 300A) includes the steps of: calculating, using virtual temperature data calculated using heat generation factor data from a virtual temperature calculation equation for estimating a temperature of a specific portion of a machine (500) including a first coefficient for determining a heat generation amount and a second coefficient for determining a heat dissipation amount, and actual temperature data acquired from at least one temperature sensor mounted to the specific portion, error between the virtual temperature data and the actual temperature data; and calculating an optimized virtual temperature calculation equation by performing machine learning to search for the first coefficient and the second coefficient so that the error is minimized. According to the machine learning method of the fifth aspect of the present disclosure, it is possible to estimate the temperature of a portion even when there is a portion to which a temperature sensor cannot be mounted in actual operation, even though it is possible to mount the temperature sensor at the time of data collection. Furthermore, it is possible to calculate the thermal displacement estimation amount of the components of the machine using the estimated temperature.

EXPLANATION OF REFERENCE NUMERALS 10, 10a, 10b control system
100 numerical control unit
200 thermal displacement compensating unit
201 virtual temperature calculating unit
202 temperature data storage unit
203 thermal displacement compensation amount calculating unit
300 machine learning unit
310 thermal displacement model calculating unit
311 displacement acquiring unit
312 temperature acquiring unit
313 virtual spindle temperature acquiring unit
314 storage unit
315 learning unit
316 error calculating unit
320 virtual temperature model calculating unit
321 heat generation factor data acquiring unit
322 error acquiring unit
323 storage unit
324 learning unit
325 virtual spindle temperature calculating unit
400 motor control unit
500 machine tool
510 motor
520 driven body
600 workpiece

What is claimed is:

1. A machine learning device for calculating an optimized virtual temperature calculation equation including a first coefficient for determining a heat generation amount and a second coefficient for determining a heat dissipation amount in order to estimate a temperature of a specific portion of a machine based on heat generation factor data of the machine having a thermally expandable machine element, the machine learning device comprising:

a memory configured to store a program; and
a processor configured to execute the program and control the machine learning device to:
acquire actual temperature data within a predetermined period from at least one temperature sensor mounted to a portion other than the specific portion of the machine;
acquire, from the machine, heat generation factor data including any of a driving current of a motor, a rotation speed of a spindle of the machine, load of the motor, temperature of the motor, and an atmospheric temperature within a predetermined period;
randomly set the first coefficient for determining the heat generation amount and the second coefficient for determining the heat dissipation amount of the specific portion of the machine, and use the heat generation factor data to acquire virtual temperature data within the predetermined period of the specific portion of the machine calculated by the virtual temperature calculation equation including the first coefficient and the second coefficient;
acquire an actually measured value of a thermal displacement amount within the predetermined period of the specific portion of the machine;
define the actual temperature data acquired, the heat generation factor data acquired, and the virtual temperature data acquired as input data, define the actually measured value of the thermal displacement amount acquired as a label, and store the input data and the label as training data in association with each other;
calculate a thermal displacement estimation amount calculation equation optimized by performing machine learning and including a third coefficient based on an error between an estimated value of a thermal displacement amount of the specific portion of the machine calculated by substituting the input data stored as the training data in the thermal displacement estimation amount calculation equation including the third coefficient, and the actually measured value of the thermal displacement amount of the specific portion of the machine stored as the label; and
calculate a virtual temperature calculation equation optimized by performing machine learning and including the first coefficient and the second coefficient to search for the first coefficient and the second coefficient based on an error between the thermal displacement estimation value of the specific portion calculated by the actual temperature data and the virtual temperature data obtained by the virtual temperature calculation equation, and the actually measured thermal displacement of the specific portion.

2. The machine learning device according to claim 1, wherein the first coefficient is a coefficient for determining a heat generation amount according to heat conduction from a motor that drives the machine and/or a coefficient for determining a heat generation amount according to bearing friction, and the second coefficient is a coefficient for determining a heat dissipation amount according to heat transfer from the specific portion of the machine to a fluid therearound.

3. The machine learning device according to claim 1, wherein the specific portion of the machine is a spindle of a machine tool.

4. The machine learning device according to claim 1, wherein the specific portion of the machine is a screw axis of a ball screw of the machine tool.

5. A machine learning device for calculating an optimized virtual temperature calculation equation including a first coefficient for determining a heat generation amount and a second coefficient for determining a heat dissipation amount in order to estimate a temperature of a specific portion of a machine based on heat generation factor data of the machine having a thermally expandable machine element, the machine learning device comprising:

a memory configured to store a program; and a processor configured to execute the program and control the machine learning device to:

acquire actual temperature data within a predetermined period from at least one temperature sensor mounted to the specific portion of the machine;

acquire, from the machine, heat generation factor data including any of a driving current of a motor, a rotation speed of a spindle of the machine, load of the motor, temperature of the motor, and an atmospheric temperature within the predetermined period;

randomly set the first coefficient for determining the heat generation amount and the second coefficient for determining the heat dissipation amount of the specific portion of the machine and based on an error between the virtual temperature data of the specific portion of the machine obtained by substituting the heat generation factor in the virtual temperature calculation equation and the actual temperature data acquired from the at least one temperature sensor mounted to the specific portion, calculate a virtual temperature calculation equation optimized by machine learning to search for the first coefficient and the second coefficient.

6. The machine learning device according to claim 5, wherein the processor is further configured to control the machine learning device to:

acquire actual temperature data within the predetermined period from at least one temperature sensor mounted to a portion other than the specific portion of the machine;

acquire virtual temperature data within the predetermined period of the specific portion of the machine calculated using the heat generation factor data by the optimized virtual temperature calculation equation calculated;

acquire an actually measured value of a thermal displacement amount within the predetermined period of the specific portion of the machine;

define actual temperature data of a portion other than the specific portion acquired and virtual temperature data acquired as input data, define actually measured value of the thermal displacement amount acquired as a label, and store the input data and the label as training data in association with each other, calculate a thermal displacement estimation amount calculation equation optimized by performing machine learning and including a third coefficient based on an error between an estimated value of a thermal displacement amount of the specific portion of the machine calculated by substituting the input data stored as the training data in the thermal displacement estimation amount calculation equation including the third coefficient, and the actually measured value of the thermal displacement amount of the specific portion of the machine stored as the label.

7. The machine learning device according to claim 5, wherein the specific portion of the machine is a turret of a machine tool.

8. A control system, comprising:

the machine learning device according to claim 1;

a memory configured to store a virtual temperature calculation equation and a thermal displacement estimation amount calculation equation outputted from the machine learning device, and a processor configured to calculate, using virtual temperature data calculated from the virtual temperature calculation equation and actual temperature data acquired from at least one temperature sensor mounted to a portion other than the specific portion, an estimated value of thermal displacement by the thermal displacement estimation amount calculation equation, and calculate a thermal displacement compensation amount based on the estimated value of the thermal displacement; and a numerical controller configured to compensate a control command outputted to a motor control unit that controls a motor based on the thermal displacement compensation amount.

9. A machine learning method executed by a machine learning device including a memory configured to store a program and a processor for calculating an optimized virtual temperature calculation equation including a first coefficient for determining a heat generation amount and a second coefficient for determining a heat dissipation amount in order to estimate a temperature of a specific portion of a machine based on heat generation factor data of the machine having a thermally expandable machine element, the processor executing the program to perform operations of the machine learning method comprising:

acquiring actual temperature data within a predetermined period from at least one temperature sensor mounted to a portion other than the specific portion of the machine;

acquiring, from the machine, heat generation factor data including any of a driving current of a motor, a rotation speed of a spindle of the machine, load of the motor, temperature of the motor, and an atmospheric temperature within the predetermined period;

randomly setting the first coefficient for determining the heat generation amount and the second coefficient for determining the heat dissipation amount of the specific portion of the machine, and using the heat generation factor data to acquire virtual temperature data within the predetermined period of the specific portion of the machine calculated by the virtual temperature calculation equation including the first coefficient and the second coefficient;

acquiring an actually measured value of a thermal displacement amount within the predetermined period of the specific portion of the machine;

defining the actual temperature data acquired, the heat generation factor data acquired, and the virtual temperature data acquired as input data, defining the actually measured value of the thermal displacement amount acquired as a label, and storing the input data and the label as training data in association with each other;

calculating a thermal displacement estimation amount calculation equation optimized by performing machine learning and including a third coefficient based on an error between an estimated value of a thermal displacement amount of the specific portion of the machine calculated by substituting the input data stored as the training data in the thermal displacement estimation amount calculation equation including the third coefficient, and the actually measured value of the thermal displacement amount of the specific portion of the machine stored as the label;

calculating a virtual temperature calculation equation optimized by performing machine learning and including the first coefficient and the second coefficient to search for the first coefficient and the second coefficient based on an error between the thermal displacement estimation value of the specific portion calculated by the actual temperature data and the virtual temperature data obtained by the virtual temperature calculation equation, and the actually measured thermal displacement of the specific portion; and controlling the machine learning method based on the calculated virtual temperature calculation equation.

10. A machine learning method executed by a machine learning device including a memory configured to store a program and a processor for calculating an optimized virtual temperature calculation equation including a first coefficient for determining a heat generation amount and a second coefficient for determining a heat dissipation amount in order to estimate a temperature of a specific portion of a machine based on heat generation factor data of the machine having a thermally expandable machine element, the processor executing the program to perform operations of the machine learning method comprising:

acquiring actual temperature data within a predetermined period from at least one temperature sensor mounted to the specific portion of the machine;

acquiring, from the machine, heat generation factor data including any of a driving current of a motor, a rotation speed of a spindle of the machine, load of the motor, temperature of the motor, and an atmospheric temperature within the predetermined period;

randomly setting the first coefficient for determining the heat generation amount and the second coefficient for determining the heat dissipation amount of the specific portion of the machine;

calculating a virtual temperature calculation equation optimized by machine learning to search for the first coefficient and the second coefficient based on an error between the virtual temperature data of the specific portion of the machine obtained by substituting the heat generation factor in the virtual temperature calculation equation and the actual temperature data acquired from the at least one temperature sensor mounted to the specific portion; and controlling the machine learning method based on the calculated virtual temperature calculation equation.

11. A control system, comprising:

the machine learning device according to claim 6;

a memory configured to store a virtual temperature calculation equation and a thermal displacement estimation amount calculation equation outputted from the machine learning device, and a processor configured to calculate, using virtual temperature data calculated from the virtual temperature calculation equation and actual temperature data acquired from at least one temperature sensor mounted to a portion other than the specific portion, an estimated value of thermal displacement by the thermal displacement estimation amount calculation equation, and calculate a thermal displacement compensation amount based on the estimated value of the thermal displacement; and a numerical controller configured to compensate a control command outputted to a motor control unit that controls a motor based on the thermal displacement compensation amount.

\* \* \* \* \*